United States Patent
Xiao et al.

(10) Patent No.: US 11,026,281 B2
(45) Date of Patent: Jun. 1, 2021

(54) METHOD EXECUTED IN USER EQUIPMENT AND BASE STATION AND CORRESPONDING DEVICES

(71) Applicants: SHARP KABUSHIKI KAISHA, Sakai (JP); FG Innovation Company Limited, Tuen Mun (HK)

(72) Inventors: Fangying Xiao, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 11 days.

(21) Appl. No.: 16/496,063

(22) PCT Filed: Mar. 19, 2018

(86) PCT No.: PCT/CN2018/079446
§ 371 (c)(1),
(2) Date: Sep. 20, 2019

(87) PCT Pub. No.: WO2018/171546
PCT Pub. Date: Sep. 27, 2018

(65) Prior Publication Data
US 2021/0112610 A1    Apr. 15, 2021

(30) Foreign Application Priority Data

Mar. 23, 2017  (CN) .......................... 201710180715.3

(51) Int. Cl.
*H04W 76/15*    (2018.01)
*H04W 28/04*    (2009.01)
(Continued)

(52) U.S. Cl.
CPC ............ *H04W 76/15* (2018.02); *H04L 1/1614* (2013.01); *H04L 5/0098* (2013.01); *H04W 28/04* (2013.01); *H04W 80/02* (2013.01)

(58) Field of Classification Search
CPC ......... H04L 1/00; H04L 1/1614; H04L 1/189; H04L 5/0053; H04L 5/0098; H04W 28/04;
(Continued)

(56) References Cited

U.S. PATENT DOCUMENTS 8,605,674 B2 * 12/2013 Park .......................... H04L 1/08
                                                                  370/329
10,716,094 B2 *  7/2020 Babaei .................. H04L 1/1874
(Continued)

FOREIGN PATENT DOCUMENTS

WO   WO-2018171546 A1 *  9/2018
WO   WO-2020087258 A1 *  5/2020 ............... H04L 5/00
WO   WO-2020093771 A1 *  5/2020 ............ H04W 28/04

OTHER PUBLICATIONS

Rayavarapu et al., Dynamic Control of Packet Duplication in 5G-NR Dual Connectivity Architecture, Jan. 7, 2020, 2020 International Conference on COMmunication Systems & NETworkS (COMSNETS), pp. 539-542, doi: 10.1109/COMSNETS48256.2020.9027289 (Year: 2020).*

(Continued)

*Primary Examiner* — Eric Nowlin
(74) *Attorney, Agent, or Firm* — ScienBiziP, P.C.

(57) ABSTRACT

The present disclosure provides a method performed at user equipment (UE) and corresponding UE. The method comprises: receiving a medium access control (MAC) control element (CE) so as to indicate activating and/or deactivating of packet duplication of a data radio bearer (DRB); if the packet duplication is configured and the packet duplication is activated, then submitting, by a Packet Data Convergence (Continued)

Protocol (PDCP) entity, a PDCP protocol data unit (PDU) to two radio link control (RLC) entities; and if the packet duplication is configured and the packet duplication is deactivated, then submitting, by the PDCP entity, the PDCP PDU to one of the two RLC entities, wherein the MAC CE comprises a bitmap having a fixed size, each bit in the bitmap corresponding to a packet duplication DRB identity arranged in an ascending order; and a bit set to 1 in the bitmap indicates activating of the packet duplication of the corresponding DRB, and a bit set to 0 in the bitmap indicates deactivating of the packet duplication of the corresponding DRB. The present disclosure further provides another method performed at UE and corresponding UE, as well as a method performed at a base station and a corresponding base station.

5 Claims, 18 Drawing Sheets

(51) Int. Cl.
*H04W 80/02* (2009.01)
*H04L 5/00* (2006.01)
*H04L 1/16* (2006.01)

(58) Field of Classification Search
CPC ... H04W 28/06; H04W 28/065; H04W 76/15; H04W 76/20; H04W 80/02; H04W 80/08
See application file for complete search history.

(56) References Cited

U.S. PATENT DOCUMENTS

| | | | | |
|---|---|---|---|---|
| 10,764,870 | B2* | 9/2020 | Yi | H04W 24/08 |
| 10,772,008 | B2* | 9/2020 | Park | H04L 41/0816 |
| 2012/0057560 | A1* | 3/2012 | Park | H04L 1/189 370/329 |
| 2016/0302075 | A1* | 10/2016 | Dudda | H04W 12/106 |
| 2018/0367288 | A1* | 12/2018 | Vrzic | H04W 36/0069 |
| 2018/0368132 | A1* | 12/2018 | Babaei | H04W 80/02 |
| 2018/0375621 | A1* | 12/2018 | Turtinen | H04L 1/1816 |
| 2019/0239279 | A1* | 8/2019 | Shi | H04W 76/15 |
| 2019/0253926 | A1* | 8/2019 | Kim | H04W 28/0278 |
| 2019/0394693 | A1* | 12/2019 | Kim | H04W 24/08 |
| 2020/0037151 | A1* | 1/2020 | Du | H04L 1/22 |
| 2020/0053715 | A1* | 2/2020 | Jang | H04W 76/14 |
| 2020/0107392 | A1* | 4/2020 | Yl | H04W 76/38 |
| 2020/0153555 | A1* | 5/2020 | Shi | H04W 4/70 |
| 2020/0187282 | A1* | 6/2020 | Yu | H04L 1/18 |
| 2020/0252330 | A1* | 8/2020 | Wei | H04L 45/24 |

OTHER PUBLICATIONS

Aijaz, Packet Duplication in Dual Connectivity Enabled 5G Wireless Networks: Overview and Challenges, Dec. 6, 2019, IEEE Communications Standards Magazine, vol. 3, No. 3, pp. 20-28, doi: 10.1109/MCOMSTD.001.1700065 (Year: 2019).*
Rao et al., Packet Duplication for URLLC in 5G: Architectural Enhancements and Performance Analysis, Apr. 2, 2018, IEEE Network, vol. 32, Issue 2, pp. 32-40, doi: 10.1109/MNET.2018.1700227 (Year: 2018).*
Rao et al., Packet duplication for URLLC in 5G dual connectivity architecture, Jun. 11, 2018, 2018 IEEE Wireless Communications and Networking Conference (WCNC), pp. 1-6, doi: 10.1109/WCNC.2018.8377054 (Year: 2018).*
Huawei et al., Evaluation on packet duplication in multi-connectivity, Jan. 17, 2017, 3GPP, 3GPP TSG-RAN2 NR Ad Hoc, Tdoc: R2-1700172 (Year: 2017).*
Ericsson, Handling of PDCP duplication for SRB in LTE-NR interworking, Apr. 3, 2017, 3GPP TSG-RAN WG2 #97bis, Tdoc: R2-1702706 (Year: 2017).*
Ericsson, Duplication in UL in Dual connectivity , Apr. 3, 2017, 3GPP TSG-RAN WG2 #97bis, Tdoc: R2-1702750 (Year: 2017).*
LG Electronics Inc., Configurability of packet duplication in PDCP, Apr. 3, 2017, 3GPP TSG-RAN WG2#97bis, Tdoc: R2-1703509 (Year: 2017).*
LG Electronics Inc., Packet duplication in PDCP, May 15, 2017, 3GPP TSG-RAN WG2#98, Tdoc: R2-1704143 (Year: 2017).*
Catt, Configuration and activation/deactivation of duplication, May 15, 2017, 3GPP TSG-RAN WG2 Meeting #98, Tdoc: R2-1704247 (Year: 2017).*
ZTE, Consideration on the activation/deactivation of data duplication for CA, May 15, 2017, 3GPP TSG-RAN WG2 Meeting #98, Tdoc: R2-1704660 (Year: 2017).*
Huawei, Email discussion summary on control of UL PDCP duplication, May 15, 2017, 3GPP TSG-RAN WG2 Meeting #98, Tdoc: R2-1704834 (Year: 2017).*
Huawei et al., Dynamic activation/deactivation of packet duplication, May 15, 2017, 3GPP TSG-RAN WG2 Meeting #98, Tdoc: R2-1704835 (Year: 2017).*
InterDigital Inc., Control of PDCP duplication, May 15, 2017, 3GPP TSG-RAN WG2 Meeting #98, Tdoc: R2-1704916 (Year: 2017).*
Sharp, Enable/Disable PDCP Duplication, May 15, 2017, 3GPP TSG-RAN WG2 Meeting #98, Tdoc: R2-1704941 (Year: 2017).*
Qualcomm Incorporated, Discussion on PDCP duplication, May 15, 2017, 3GPP TSG-RAN WG2 Meeting #98, Tdoc: R2-1705056 (Year: 2017).*
ASUSTek, Activation and Deactivation of UL PDCP duplication, May 15, 2017, 3GPP TSG-RAN WG2 Meeting #98, Tdoc: R2-1705416 (Year: 2017).*
Samsung, Discussion on Packet Duplication, May 15, 2017, 3GPP TSG-RAN WG2 Meeting #98, Tdoc: R2-1705727 (Year: 2017).*
Oppo, The impact of duplication MAC, Jun. 27, 2017, 3GPP TSG RAN WG2#NR_AdHoc#2, Tdoc: R2-1706344 (Year: 2017).*
Oppo, Details of the duplication control MAC CE, Aug. 21, 2017, 3GPP TSG RAN WG2 #99, Tdoc: R2-1707741 (Year: 2017).*
MediaTek Inc., MAC CE design for duplication, Aug. 21, 2017, 3GPP TSG-RAN WG2 #99, Tdoc: R2-1708102 (Year: 2017).*
Ericsson, MAC CE details for activation and deactivation of PDCP data duplication, Aug. 21, 2017, Tdoc: R2-1708331 (Year: 2017).*
Samsung, Interaction between RLC Entities for PDCP Duplication, Aug. 21, 2017, 3GPP TSG-RAN WG2 #99, Tdoc: R2-1709027 (Year: 2017).*
Samsung, MAC CE for Activation/Deactivation of PDCP Duplication, Aug. 21, 2017, 3GPP TSG-RAN WG2#99, Tdoc: R2-1709029 (Year: 2017).*
Samsung, PDCP Duplication Operations, Aug. 21, 2017, 3GPP TSG-RAN WG2#99, Tdoc: R2-1709032 (Year: 2017).*
Samsung, Uplink DRB Duplication, Aug. 21, 2017, 3GPP TSG-RAN WG2#99, Tdoc: R2-1709036 (Year: 2017).*
LG Electronics Inc., Packet duplication with implicit SCell deactivation, Aug. 21, 2017, 3GPP TSG-RAN WG2 #99, Tdoc: R2-1709096 (Year: 2017).*
ASUSTeK, PDCP duplication and SCell (de-)activation, Aug. 21, 2017, 3GPP TSG-RAN WG2#99, Tdoc: R2-1709327 (Year: 2017).*
Nokia et al., More consideration on uplink duplication in dual connectivity, Aug. 21, 2017, 3GPP TSG-RAN WG2#99, Tdoc: R2-1709425 (Year: 2017).*
ITL, Configuration of PDCP duplication, Aug. 21, 2017, 3GPP TSG-RAN WG2 #99, Tdoc: R2-1709628 (Year: 2017).*
ITL, MAC CE design for activation/deactivation of PDCP duplication, Aug. 21, 2017, 3GPP TSG-RAN WG2#99, Tdoc: R2-1709629 (Year: 2017).*
NTT Docomo, "New SID Proposal: Study on New Radio Access Technology", RP-160671, 3GPP TSG RAN Meeting #71 Göteborg, Sweden, Mar. 7-10, 2016.
LG Electronics Inc, "Packet duplication in PDCP", R2-1701462, 3GPP TSG-RAN WG2 #97 Athens, Greece, Feb. 13-Feb. 17, 2017.
LG Electronics Inc, "Packet duplication in NR", R2-1700423, 3GPP TSG-RAN WG2 NR Ad Hoc Spokane, USA, Jan. 17-19, 2017.

* cited by examiner

| HFN | PDCP SN |
|---|---|

FIG. 9

METHOD EXECUTED IN USER EQUIPMENT AND BASE STATION AND CORRESPONDING DEVICES

TECHNICAL FIELD

The present disclosure relates to the field of wireless communications technologies. More specifically, the present disclosure relates to a method executed at user equipment (UE) and corresponding UE, as well as a method executed at a base station and a corresponding base station.

BACKGROUND

A new research item on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: enhanced mobile broadband communications (Enhanced mobile broadband: eMBB), massive machine type communications (massive Machine type communication: mMTC), and ultra reliable and low latency communications (Ultra reliable and low latency communications: URLLC).

In the 3GPP RAN2 #96 meeting held in October 2016, it was agreed that research will be performed on multi-connection (including dual-connection) so as to meet the reliability requirement of the URLLC. The multi-connection may adopt a mechanism such as packet duplication or link selection. In the 3GPP NR AdHoc meeting held in January 2017, it was agreed that an NR-PDCP entity supports a packet duplication function of a user plane and a control plane, where the function of a PDCP entity at a transmitting end is to support packet duplication, while the function of a PDCP entity at a receiving end is to support packet de-duplication. In the 3GPP RAN2#97 meeting held in February 2017, it was agreed that both uplink and downlink support that in carrier aggregation, packet duplication uses a Packet Data Convergence Protocol (PDCP) protocol data unit (PDU) and/or service data unit (SDU) for transmission on multiple logical channels and causes duplicate PDCP PDUs to be transmitted through different carriers.

It is expected to solve problems related to a packet duplication bearer in multi-connection scenarios and carrier aggregation scenarios supporting packet duplication, including problems of configuration and reconfiguration of a signaling radio bearer (SRB), activating and deactivating of a packet duplication function of a PDCP entity, and how to perform processing when UE receives duplicate PDCP PDUs from a packet duplication SRB.

SUMMARY

According to a first aspect of the present disclosure, a method executed at UE is provided. The method comprises: receiving a medium access control (MAC) control element (CE) so as to indicate activating and/or deactivating of packet duplication of a data radio bearer (DRB); if the packet duplication is configured and the packet duplication is activated, then submitting, by a Packet Data Convergence Protocol (PDCP) entity, a PDCP protocol data unit (PDU) to two radio link control (RLC) entities; and if the packet duplication is configured and the packet duplication is deactivated, then submitting, by the PDCP entity, the PDCP PDU to one of the two RLC entities. The MAC CE comprises a bitmap having a fixed size, each bit in the bitmap corresponding to a packet duplication DRB identity arranged in an ascending order. A bit set to 1 in the bitmap indicates activating of the packet duplication of the corresponding DRB, and a bit set to 0 in the bitmap indicates deactivating of the packet duplication of the corresponding DRB.

According to a second aspect of the present disclosure, UE is provided, comprising: a receiving unit, configured to receive a medium access control (MAC) control element (CE) so as to indicate activating and/or deactivating of packet duplication of a data radio bearer (DRB), and a submitting unit, configured to: if the packet duplication is configured and the packet duplication is activated, then submit, by a Packet Data Convergence Protocol (PDCP) entity, a PDCP protocol data unit (PDU) to two radio link control (RLC) entities; and if the packet duplication is configured and the packet duplication is deactivated, then submit, by the PDCP entity, the PDCP PDU to one of the two RLC entities. The MAC CE comprises a bitmap having a fixed size, each bit in the bitmap corresponding to a packet duplication DRB identity arranged in an ascending order. A bit set to 1 in the bitmap indicates activating of the packet duplication of the corresponding DRB, and a bit set to 0 in the bitmap indicates deactivating of the packet duplication of the corresponding DRB.

According to a third aspect of the present disclosure, a method executed by a base station is provided. The method comprises: transmitting a medium access control (MAC) control element (CE) so as to indicate to user equipment (UE) activating and/or deactivating of packet duplication of a data radio bearer (DRB). If the packet duplication is configured and the packet duplication is activated, then a Packet Data Convergence Protocol (PDCP) entity of the UE submits a PDCP protocol data unit (PDU) to two radio link control (RLC) entities. If the packet duplication is configured and the packet duplication is deactivated, then the PDCP entity submits the PDCP PDU to one of the two RLC entities. The MAC CE comprises a bitmap having a fixed size, each bit in the bitmap corresponding to a packet duplication DRB identity arranged in an ascending order. A bit set to 1 in the bitmap indicates activating of the packet duplication of the corresponding DRB, and a bit set to 0 in the bitmap indicates deactivating of the packet duplication of the corresponding DRB.

According to a fourth aspect of the present disclosure, a base station (BS) is provided, comprising: a transmitting unit, configured to transmit a medium access control (MAC) control element (CE) so as to indicate to user equipment (UE) activating and/or deactivating of packet duplication of a data radio bearer (DRB). If the packet duplication is configured and the packet duplication is activated, then a Packet Data Convergence Protocol (PDCP) entity of the UE submits a PDCP protocol data unit (PDU) to two radio link control (RLC) entities; and if the packet duplication is configured and the packet duplication is deactivated, then the PDCP entity submits the PDCP PDU to one of the two RLC entities. The MAC CE comprises a bitmap having a fixed size, each bit in the bitmap corresponding to a packet duplication DRB identity arranged in an ascending order. A bit set to 1 in the bitmap indicates activating of the packet duplication of the corresponding DRB, and a bit set to 0 in the bitmap indicates deactivating of the packet duplication of the corresponding DRB.

According to a fifth aspect of the present disclosure, a method executed at user equipment (UE) is provided, comprising: receiving a Packet Data Convergence Protocol (PDCP) data protocol data unit (PDU) from a lower layer; if the PDCP data PDU has been received before, then performing integrity verification on the PDCP data PDU; and if the integrity verification fails, then indicating the integrity verification failure to an upper layer.

According to a sixth aspect of the present disclosure, user equipment (UE) is provided, comprising: a receiving unit, configured to receive a Packet Data Convergence Protocol (PDCP) data protocol data unit (PDU) from a lower layer; a verification unit, configured to: if the PDCP data PDU has been received before, then perform integrity verification on the PDCP data PDU; and an indication unit, configured to: if the integrity verification fails, then indicate the integrity verification failure to an upper layer.

BRIEF DESCRIPTION OF DRAWINGS

The above and other features of the present disclosure will become more apparent with the following detailed description in conjunction with the accompanying drawings.

FIG. 9 is a schematic diagram of COUNT;

DETAILED DESCRIPTION

Figure 1:
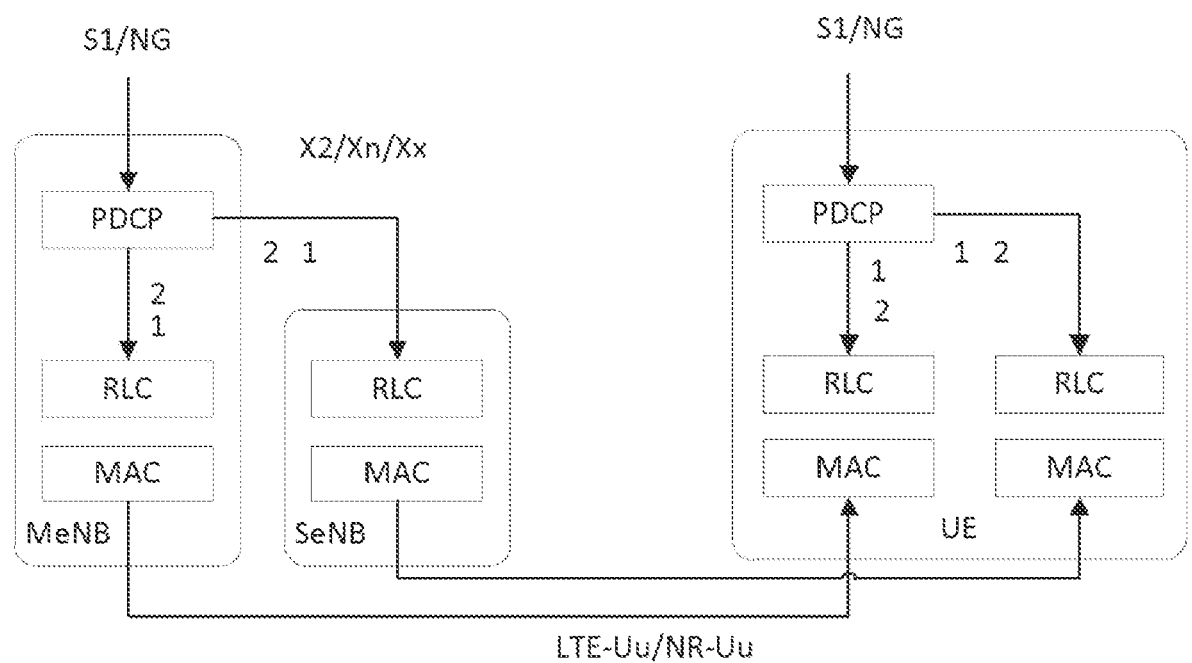
FIG. 1 is a schematic diagram illustrating data transmission of an MCG packet duplication split DRB.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in New Radio (NR), Long Term Evolution (LTE), and enhanced Long Term Evolution (eLTE), but unified terms are used in the present disclosure. When applied to a specific system, the terms may be replaced with terms used in the corresponding system.

RRC: Radio Resource Control.

PDCP: Packet Data Convergence Protocol. In the present disclosure, if not specifically indicated, the PDCP may represent a PDCP in NR or LTE or eLTE.

RLC: Radio Link Control. In the present disclosure, if not specifically indicated, the RLC may represent RLC in NR or LTE or eLTE.

MAC: Medium Access Control. In the present disclosure, if not specifically indicated, the MAC may represent MAC in NR or LTE or eLTE.

DTCH: Dedicated Traffic Channel.

CCCH: Common Control Channel.

DCCH: Dedicated Control Channel.

PDU: Protocol Data Unit.

SDU: Service Data Unit.

In the present disclosure, data received from or delivered to an upper layer is referred to as an SDU, and data submitted to or received from a lower layer is referred to as a PDU. For example, data received from or delivered to an upper layer by a PDCP entity is referred to as a PDCP SDU; and data received from or submitted to an RLC entity by the PDCP entity is referred to as a PDCP PDU (namely, an RLC SDU).

Master base station: Master eNB, denoted as MeNB (a base station corresponding to E-UTRAN or LTE or eLTE) or MgNB (a base station corresponding to 5G-RAN or NR). The master base station is a base station that at least terminates at a mobility management entity (denoted as S1-MME) as a control node for processing interaction between UE and a core network in multi-connection. In the present disclosure, master base stations are all denoted as MeNBs. It should be noted that all schemes or definitions applicable to the MeNB are also applicable to the MgNB.

Secondary base station: Secondary eNB, denoted as SeNB (a base station corresponding to E-UTRAN or LTE or eLTE) or SgNB (a base station corresponding to 5G-RAN or NR). The secondary base station is a base station that provides additional radio resources for UE but does not serve as an MeNB in multi-connection. In the present disclosure, secondary base stations are all denoted as SeNBs. It should be noted that all schemes or definitions applicable to the SeNB are also applicable to the SgNB.

Primary cell: Primary Cell (PCell). The PCell is a cell that operates on the primary frequency, and is a cell on which UE performs an initial connection establishment procedure or initiates a connection reestablishment procedure or which is designated as a primary cell during a handover procedure.

Primary secondary cell: Primary Secondary Cell (PSCell). The PSCell is an SCG cell in which UE is instructed to perform random access when performing the SCG change procedure.

Secondary cell: Secondary Cell (SCell). The SCell is a cell that operates on the secondary frequency. The cell can be configured once an RRC connection is established and can be used to provide additional radio resources.

Cell group: Cell Group (CG). The CG is a group of serving cells or carriers associated with a master base station or secondary base station. It should be noted that the cell in the present disclosure may also be referred to as a set of beams.

Master cell group: Master Cell Group (MCG). For UE not configured with multi-connection, the MCG comprises all serving cells; for UE configured with multi-connection, the MCG comprises a subset of serving cells (namely, a group of serving cells associated with an MeNB or MgNB) comprising of a PCell and 0, 1, or more SCells.

Secondary cell group: Secondary Cell Group (SCG). The SCG is a group of serving cells associated with an SeNB or SgNB in multi-connection. The SCG may include one PSCell, and may further include one or more SCells.

Multi-connection: an operation mode of UE in an RRC connected state. In the multi-connection, multiple cell groups are configured, and the multiple cell groups include one MCG and one or more SCGs (namely, the UE is connected to multiple base stations). If only one MCG (or MeNB or MgNB) and one SCG (or SeNB or SgNB) are configured, then the multi-connection is referred to as dual-connection. Namely the UE in the connected state and having multiple receivers and/or transmitters is configured to use EUTRAN and/or 5G-RAN radio resources provided by multiple different schedulers; the schedulers may be connected by non-ideal backhaul or ideal backhaul. The multi-connection in the present disclosure includes dual-connection. A multi-connection data transmission mode includes, but is not limited to, data duplication and link selection.

DRB: Data Radio Bearer carrying user plane data, also referred to as a data bearer for short.

SRB: Signaling Radio Bearer. The bearer may be used for transmitting an RRC message and a Non-Access Stratum (NAS) message or for transmitting only an RRC message and a NAS message. The SRB may include SRB0, SRB1, SRB1bis, and SRB2. SRB0 is used for an RRC message using a CCCH logical channel; SRB1 is used for an RRC message using a DCCH logical channel, where the RRC message may include a NAS message; SRB1 is further used for transmitting a NAS message before SRB2 is established. SRB1bis is used for an RRC message and a NAS message using a DCCH logical channel prior to secure activation, where the RRC message may include a NAS message. SRB2 is used for an RRC message and a NAS message using a DCCH logical channel, where the RRC message includes recorded measurement information (or referred to as a measurement log).

The bearer in the present disclosure may be a DRB or an SRB.

Split DRB: a bearer whose wireless protocol is located in both MeNB (or MgNB) and SeNB (or SgNB) and which uses resources of both the MeNB (or MgNB) and the SeNB (or SgNB) in multi-connection. If a PDCP entity of the split DRB is located in a master base station (namely, data arrives at the master base station first and is forwarded by the master base station to a secondary base station to split the data in the master base station), then the split DRB is referred to as an MCG split DRB; if a PDCP entity of the split DRB is located in a secondary base station (namely, data arrives at the secondary base station first and is forwarded by the secondary base station to a master base station to split the data in the secondary base station), then the split DRB is referred to as an SCG split DRB. If not specifically indicated, the split DRB in the present disclosure may be an MCG split DRB or an SCG split DRB.

Split SRB: a bearer of which a wireless protocol is located in an MeNB (or MgNB) and an SeNB (or SgNB) and which uses resources of both the MeNB (or MgNB) and the SeNB (or SgNB) in multi-connection. If a PDCP entity and/or RRC of the split SRB is located in a master base station (namely, signaling, also referred to as data, is forwarded by the master base station to a secondary base station to split the signaling in the master base station), then the split SRB is referred to as an MCG split SRB; if a PDCP entity and/or RRC of the split SRB is located in a secondary base station (namely, signaling, also referred to as data, is forwarded by the secondary base station to a master base station to split the signaling in the secondary base station), then the split SRB is referred to as an SCG split SRB. If not specifically indicated, the split SRB in the present disclosure may be an MCG split SRB or an SCG split SRB.

In the present disclosure, the split bearer may be a split SRB or a split DRB. An MCG split bearer may be an MCG split SRB or an MCG split DRB. An SCG split bearer may be an SCG split SRB or an SCG split DRB.

Packet duplication: also referred to as data duplication (if not specifically indicated, the data in the present disclosure may be control plane signaling or user plane data, which respectively correspond to signaling of an SRB and data of a DRB). In a multi-connection mode, the same data (or referred to as a packet, namely, a PDCP PDU or PDCP SDU) is transmitted in serving cells of multiple CGs; that is, the same data is transmitted by using resources provided by both a master base station (or an MCG) and a secondary base station (or an SCG); or the same data is submitted respectively to lower layers (or RLC layers) located at the MCG and the SCG; or a PDCP entity submits the same PDCP PDU to multiple associated lower-layer entities (or RLC entities); or the same data is transmitted on multiple different bearers. In a carrier aggregation or single-connection mode, a PDCP entity submits duplicate or the same PDCP PDUs to multiple RLC entities (or referred to as lower-layer entities) and/or logical channels, a MAC entity transmits the PDCP PDUs to a receiving end through different carriers (or serving cells), and a PDCP entity at the receiving end is responsible for detection and de-duplication of the PDCP PDUs or SDUs.

Packet duplication bearer: a bearer supporting packet duplication in a carrier aggregation or single-connection mode, including a packet duplication SRB and a packet duplication DRB. One PDCP entity of the bearer is associated with one or more RLC entities, multiple logical channels, and one or more MAC entities; a PDCP entity at a transmitting end submits duplicate or the same PDCP PDUs to the one or more RLC entities (or lower-layer entities) and/or multiple logical channels, and a MAC entity transmits the PDCP PDUs to a receiving end through different carriers (or serving cells); and a PDCP entity at the receiving end de-duplicates the PDCP PDUs or SDUs from the lower-layer entities.

Packet duplication split bearer: a split bearer supporting packet duplication in a multi-connection mode. In the transmission mode, the same data is transmitted on multiple wireless protocols of the split bearer, including an MCG packet duplication split SRB, an SCG packet duplication split SRB, an MCG packet duplication split DRB, and an SCG packet duplication split DRB. In the case of an MCG packet duplication split bearer, a PDCP entity located in a master base station or MCG is responsible for packet duplication and/or packet de-duplication; in the case of an SCG packet duplication split bearer, a PDCP entity located in a secondary base station or SCG is responsible for packet duplication and/or packet de-duplication.

pdcp-Config information element: including configurable PDCP parameters of a DRB.

rlc-Config information element: including configuration information of an RLC entity corresponding to an SRB and a DRB.

logicalChannelIdentity information element: a logical channel identity.

logicalChannelConfig information element: including parameters used for configuring a logical channel.

logicalChannelGroup information element: a logical channel group identity, which is used for mapping a logical channel to a logical channel group for BSR reporting.

FIG. 1 is a schematic diagram illustrating downlink transmission of an MCG packet duplication split DRB between a base station and user equipment (UE). It should be understood that uplink transmission of the MCG packet duplication split DRB between the base station and the UE can adopt the same protocol architecture, except that data is transmitted from the UE to the base station, namely, the arrows in FIG. 1 are reversed. As shown in FIG. 1, data (for example, a Packet Data Convergence Protocol protocol data unit (PDCP PDU)) is transmitted over multiple wireless protocols (corresponding to multiple RLC entities associated with the same PDCP entity) of the split DRB by using resources of an MeNB and an SeNB. In a PDCP PDU data duplication multi-connection mode, each PDCP PDU is transmitted to a receiving party through multiple RLC entities. An interface between the MeNB and the SeNB may be denoted as Xn or Xx or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB. Accordingly, an MCG packet duplication split SRB adopts a similar protocol architecture, and the difference lies in that an upper-layer entity delivering data to a PDCP entity is an RRC entity, and the PDCP entity receives data from a lower-layer entity and then delivers the data to the RRC entity on the upper layer.

Figure 2:
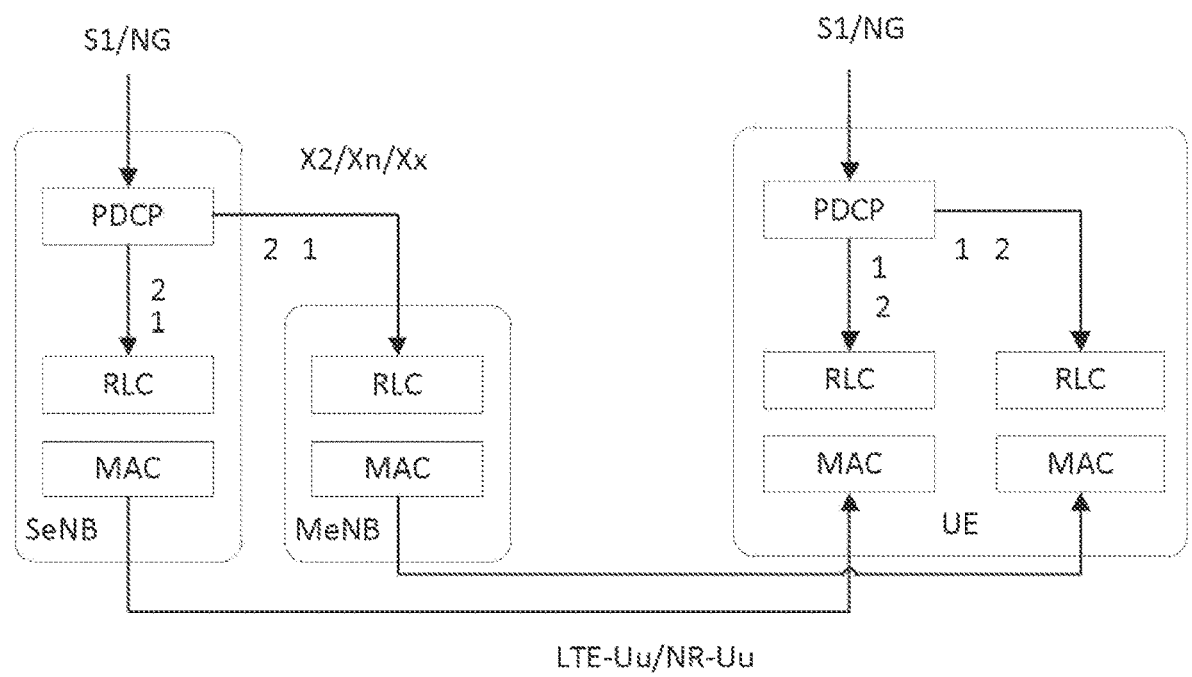
FIG. 2 is a schematic diagram illustrating data transmission of an SCG packet duplication split DRB.
Figure 3A:
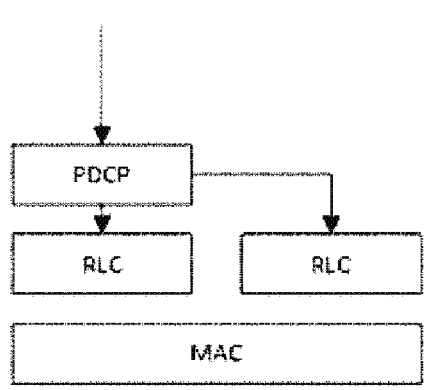
FIG. 3 is a schematic diagram of a protocol architecture in user equipment (UE)
Figure 3B:
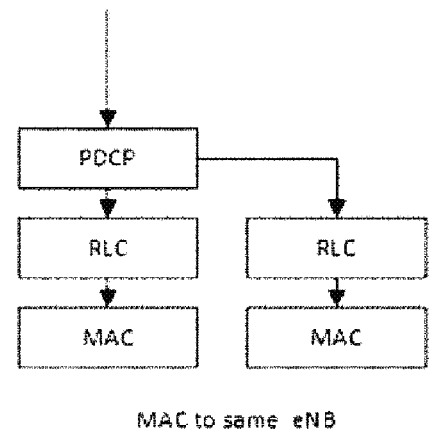
Figure 3C:
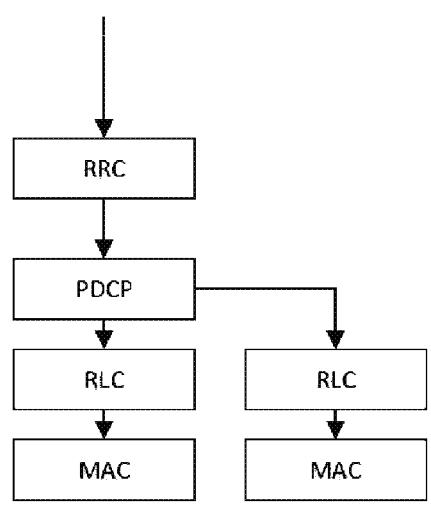
Figure 3D:
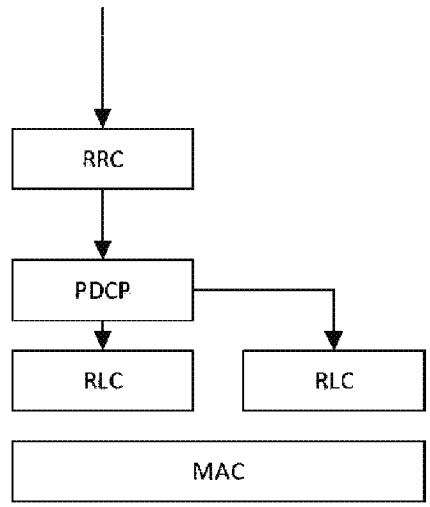

FIG. 2 is a schematic diagram illustrating downlink transmission of an SCG packet duplication split DRB between a base station and user equipment (UE). It should be understood that uplink transmission of the SCG packet duplication split DRB between the base station and the UE can adopt the same protocol architecture, except that data is transmitted from the UE to the base station, namely, the arrows in FIG. 2 are reversed. As shown in FIG. 2, data (for example, a Packet Data Convergence Protocol protocol data unit (PDCP PDU)) is transmitted over multiple wireless protocols (corresponding to multiple RLC entities associated with the same PDCP entity) of a split DRB by using resources of an MeNB and an SeNB. In a PDCP PDU data duplication multi-connection mode, each PDCP PDU is transmitted to a receiving party through multiple RLC entities. An interface between the MeNB and the SeNB may be denoted as Xn or Xx or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB. Accordingly, an SCG packet duplication split SRB adopts a similar protocol architecture, and the difference lies in that an upper-layer entity delivering data to a PDCP entity is an RRC entity, and the PDCP entity receives data from a lower-layer entity and then delivers the data to the RRC entity on the upper layer.

Some embodiments of the present disclosure use repeatedly transmitting a data packet PDCP PDU or SDU twice as an example (namely, one PDCP entity is associated with two RLC entities and/or two logical channels). However, the technical solution in the present disclosure is not limited to the scenarios of repeatedly transmitting a data packet PDCP PDU or SDU twice, and those skilled in the art can easily expand the technical solution to scenarios of repeatedly transmitting a data packet many times (namely, one PDCP entity is associated with multiple RLC entities and/or multiple logical channels).

FIG. 3 is a schematic diagram of a protocol architecture in user equipment (UE) in a carrier aggregation scenario. In the schematic diagram shown in FIG. 3(a), a PDCP entity of a DRB is associated with two RLC entities and two logical channels, and one MAC entity. In the schematic diagram shown in FIG. 3(b), a PDCP entity of a DRB is associated with two RLC entities and two logical channels, and two MAC entities. In the schematic diagram shown in FIG. 3(c), an RRC entity and a PDCP entity of an SRB are associated with two RLC entities and two logical channels, and one MAC entity. In the schematic diagram shown in FIG. 3(d), an RRC entity and a PDCP entity of an SRB are associated with two RLC entities and two logical channels, and two MAC entities.

If not specifically indicated, the activating a packet duplication function (which may also be referred to as a PDCP packet duplication function or bearer packet duplication function) in the present disclosure may also be expressed as configuring a PDCP entity to submit the same PDCP PDU to multiple associated lower-layer entities or RLC entities. In the case of an MCG packet duplication split SRB or an SCG packet duplication split SRB, the packet duplication function is activated so that the same PDCP PDU is transmitted through an MCG and an SCG. The deactivating a packet duplication function may also be expressed as configuring a PDCP entity to submit the same PDCP PDU to one of multiple associated lower-layer entities (or RLC entities); or all PDCP PDUs are transmitted through only one of the multiple lower-layer entities. For example, when an instruction to deactivate a PDCP packet duplication function from an upper layer or a MAC layer or a lower layer is received, a PDCP PDU is transmitted through only an RLC entity associated with a logical channel having a predefined logical channel identity or an RLC entity associated with a logical channel having a smaller or smallest or larger or largest logical channel identity. In the case of an MCG packet duplication split SRB, the PDCP packet duplication function is deactivated so that a PDCP PDU is transmitted through only an MCG or an SCG, or the PDCP packet duplication function is deactivated so that a PDCP PDU is transmitted through only the MCG, or the PDCP packet duplication function is deactivated so that a PDCP PDU is transmitted through only the SCG; in the case of an SCG packet duplication split SRB, the packet duplication function is deactivated so that a PDCP PDU is transmitted through only an SCG or an MCG, or the PDCP packet duplication function is deactivated so that a PDCP PDU is transmitted through only the MCG, or the PDCP packet duplication function is deactivated so that a PDCP PDU is transmitted through only the SCG.

Figure 4:
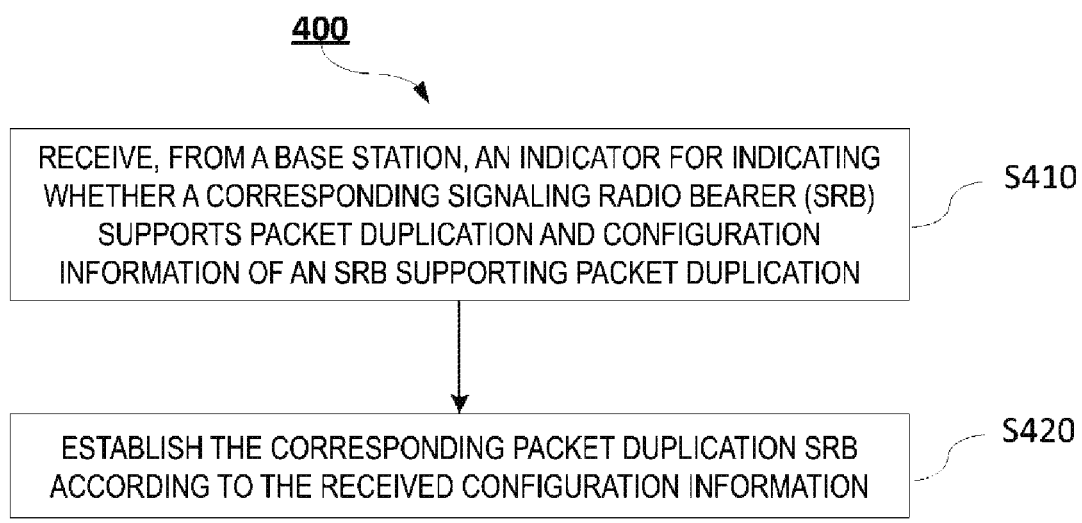
FIG. 4 is a flowchart of a method 400 used in user equipment (UE) according to an embodiment of the present disclosure.

FIG. 4 is a flowchart of a method 400 used in user equipment (UE) according to an embodiment of the present disclosure. The method 400 is used for establishing a packet duplication SRB.

As shown in the figure, in step S410, the UE receives, from a base station, an indication for indicating whether a corresponding signaling radio bearer (SRB) supports packet duplication and configuration information of an SRB supporting packet duplication.

In one implementation, if the packet duplication SRB has the same SRB identity (denoted as srb-Identity) as that of a corresponding SRB not supporting packet duplication, then the method 400 further includes: receiving the SRB identity of the corresponding packet duplication SRB from the base station (not shown).

In another implementation, if the packet duplication SRB has a different SRB identity from that of a corresponding SRB not supporting packet duplication, then the indication is the SRB identity of the packet duplication SRB. In other words, since the packet duplication SRB has a different SRB identity from that of the corresponding SRB not supporting packet duplication, upon receiving an SRB identity, the UE can determine whether the corresponding SRB supports packet duplication.

In step S420, the UE establishes the corresponding packet duplication SRB according to the received configuration information.

The following describes embodiments of establishing a packet duplication SRB by user equipment in a carrier aggregation (CA) scenario, and the embodiments are also applicable to establishment of a packet duplication split SRB.

Embodiment 1

A packet duplication SRB uses the same SRB identity as that of a corresponding SRB not supporting packet duplication (the SRB and the packet duplication SRB transmit the same data and implement the same QoS function, and the difference lies in that one supports the packet duplication function, while the other does not support the packet duplication function); then, two logical channel identities are predefined for the packet duplication SRB, where one logical channel identity is the same as that of the SRB not supporting packet duplication. For example, an SRB1 supporting packet duplication and an SRB1 not supporting packet duplication are both named SRB1. In this case, an indication is used in RRC signaling to indicate whether to establish a packet duplication SRB or an SRB not supporting packet duplication. Specifically, the following steps are included:

Step 1: User equipment receives RRC signaling (for example, an RRC connection reconfiguration message) from a base station, where the RRC signaling may include an indication for indicating whether a corresponding SRB is a packet duplication SRB or an SRB supporting packet duplication or whether a corresponding PDCP entity supports repeated transmission of a PDCP PDU twice or more or whether the corresponding PDCP entity supports the packet duplication function. For example, when the indication has a value of "1" or "TRUE" or "Setup" or when the indication appears, it indicates that the corresponding SRB is a packet duplication SRB or an SRB supporting the packet duplication function, or that the PDCP entity corresponding to the SRB supports repeated transmission of each PDCP PDU twice or more, or that the corresponding PDCP entity supports the packet duplication function; when the indication has a value of "0" or "FALSE" or "Release" or when the indication does not appear, it indicates that the corresponding SRB is not a packet duplication SRB or is an SRB not supporting the packet duplication function, or that the corresponding PDCP entity does not repeatedly transmit a PDCP PDU, or that the corresponding PDCP entity does not support the packet duplication function, or that the corresponding PDCP entity submits a PDCP PDU to one of multiple associated lower-layer entities (or RLC entities). The RRC signaling further includes configuration information of an SRB supporting packet duplication.

Step 2: The user equipment establishes the corresponding packet duplication SRB according to the configuration information of the packet duplication SRB included in the received RRC signaling. The following operations (the operations are interchangeable in terms of order) may be specifically included:

Optionally, apply a predefined configuration of the corresponding packet duplication SRB. In the case of a packet duplication split SRB, predefined configurations in an MeNB or an MCG and an SeNB or an SCG are respectively used.

Establish a PDCP entity, where if the PDCP entity requires a security configuration, then the PDCP entity is configured according to a security configuration of an MCG. If the PDCP entity or a packet duplication SCG SRB or a packet duplication SCG split SRB is established in an SCG, then the PDCP entity is configured according to a security configuration of the SCG. Optionally, the operation further includes configuring the PDCP entity to activate the packet duplication function; or configuring the PDCP entity to deactivate the packet duplication function.

Establish one or two RLC entities according to rlc-Config included in the RRC signaling, where the two RLC entities may employ the same or different configurations. If different configurations are employed, then the corresponding packet duplication SRB in the RRC signaling includes two rlc-Config information elements.

Establish two DCCH logical channels according to logicalChannelConfig included in the RRC signaling, where logical channel identities of the logical channels are respectively set to two predefined values corresponding to the packet duplication SRB. In the case of a packet duplication split SRB, predefined configurations in an MeNB or an MCG and an SeNB or an SCG are respectively used.

Embodiment 2

A packet duplication SRB uses the same SRB identity (srb-Identity) as that of a corresponding SRB not supporting packet duplication (the SRB and the packet duplication SRB transmit the same data and implement the same QoS function, and the difference lies in that one supports the packet duplication function, while the other does not support the packet duplication function), where one logical channel identity of the packet duplication SRB is a predefined logical channel identity (denoted as LCH_ID) of the corresponding SRB not supporting packet duplication, and the other logical channel identity of the packet duplication SRB is the predefined logical channel identity plus an offset. Preferably, the offset is a maximum configurable logical channel identity, and is denoted as MAX_LCH_ID. Specifically, the following steps are included:

Step 1: User equipment receives RRC signaling (for example, an RRC connection reconfiguration message) from a base station, where the RRC signaling may include an indication for indicating whether a corresponding SRB is a packet duplication SRB or an SRB supporting packet duplication, or whether a corresponding PDCP entity supports repeated transmission of a PDCP PDU twice or more, or whether the corresponding PDCP entity supports the packet duplication function. For example, when the indication has a value of "1" or "TRUE" or "Setup" or when the indication appears, it indicates that the corresponding SRB is a packet duplication SRB or an SRB supporting the packet duplication function, or that the PDCP entity corresponding to the SRB supports repeated transmission of each PDCP PDU twice or more, or that the corresponding PDCP entity supports the packet duplication function; when the indication has a value of "0" or "FALSE" or "Release" or when the indication does not appear, it indicates that the corresponding SRB is not a packet duplication SRB or is an SRB not supporting the packet duplication function, or that the corresponding PDCP entity does not support repeated transmission of a PDCP PDU, or that the corresponding PDCP entity does not support the packet duplication function. The RRC signaling further includes configuration information of an SRB supporting packet duplication.

Step 2: The user equipment establishes the corresponding packet duplication SRB according to the configuration information of the packet duplication SRB included in the received RRC signaling. The following operations (the operations are interchangeable in terms of order) may be specifically included:

Optionally, apply a predefined configuration of the corresponding packet duplication SRB.

Establish a PDCP entity, where if the PDCP entity requires a security configuration, then the PDCP entity is configured according to a security configuration of an MCG. If the PDCP entity or a packet duplication SCG SRB or a packet duplication SCG split SRB is established in an SCG, then the PDCP entity is configured according to a security configuration of the SCG. Optionally, the operation further includes configuring the PDCP entity to activate the packet duplication function; or configuring the PDCP entity to deactivate the packet duplication function.

Establish one or two RLC entities according to rlc-Config included in the RRC signaling, where the two RLC entities may employ the same or different configurations. If different configurations are employed, then the corresponding packet duplication SRB in the RRC signaling includes two rlc-Config information elements.

Establish two DCCH logical channels according to logicalChannelConfig included in the RRC signaling. A logical channel identity of one logical channel is set to a predefined value LCH_ID, and a logical channel identity of the other logical channel is set to LCH_ID+ offset. Preferably, the logical channel identity of the other logical channel is LCH_ID+MAX_LCH_ID. If a third logical channel further needs to be established, then a corresponding logical channel identity may be set to LCH+2(offset), and so on. That is, logical channel identities of other logical channels are LCH_ID plus a multiple of the offset.

Embodiment 3

A packet duplication SRB uses the same SRB identity (srb-Identity) as that of a corresponding SRB not supporting packet duplication (the SRB and the packet duplication SRB transmit the same data and implement the same QoS function, and the difference lies in that one supports the packet duplication function, while the other does not support the packet duplication function), where one logical channel identity of the packet duplication SRB is a predefined logical channel identity (denoted as LCH_ID) of the corresponding SRB not supporting packet duplication, and the other logical channel identity of the packet duplication SRB is included in RRC signaling for configuring the packet duplication SRB.

Step 1: User equipment receives RRC signaling (for example, an RRC connection reconfiguration message) from a base station, where the RRC signaling may include an indication for indicating whether a corresponding SRB is a packet duplication SRB or an SRB supporting packet duplication or whether a corresponding PDCP entity supports repeated transmission of a PDCP PDU twice or more or whether the corresponding PDCP entity supports the packet duplication function. For example, when the indication has a value of "1" or "TRUE" or "Setup" or when the indication appears, it indicates that the corresponding SRB is a packet duplication SRB or an SRB supporting the packet duplication function, or that the PDCP entity corresponding to the SRB supports repeated transmission of each PDCP PDU twice or more, or that the corresponding PDCP entity supports the packet duplication function; when the indication has a value of "0" or "FALSE" or "Release" or when the indication does not appear, it indicates that the corresponding SRB is not a packet duplication SRB or is an SRB not supporting the packet duplication function, or that the corresponding PDCP entity does not support repeated transmission of a PDCP PDU, or that the corresponding PDCP entity does not support the packet duplication function. The RRC signaling further includes configuration information of an SRB supporting packet duplication.

Step 2: The user equipment establishes the corresponding packet duplication SRB according to the configuration information of the packet duplication SRB included in the received RRC signaling. The following operations (the operations are interchangeable in terms of order) may be specifically included:

Optionally, apply a predefined configuration of the corresponding packet duplication SRB.

Establish a PDCP entity, where if the PDCP entity requires a security configuration, then the PDCP entity is configured according to a security configuration of an MCG. If the PDCP entity or a packet duplication SCG SRB or a packet duplication SCG split SRB is established in an SCG, then the PDCP entity is configured according to a security configuration of the SCG. Optionally, the operation further includes configuring the PDCP entity to activate the packet duplication function; or configuring the PDCP entity to deactivate the packet duplication function.

Establish one or two RLC entities according to ric-Config included in the RRC signaling, where the two RLC entities may employ the same or different configurations. If different configurations are employed, then the corresponding packet duplication SRB in the RRC signaling includes two rlc-Config information elements.

Establish two DCCH logical channels according to logicalChannelConfig included in the RRC signaling, where a logical channel identity of one logical channel is set to a predefined value, and a logical channel identity of the other logical channel is set to a corresponding value carried in the RRC signaling.

Embodiment 4

A packet duplication SRB uses a different SRB identity (srb-Identity) from that of a corresponding SRB not supporting packet duplication (the SRB and the packet duplication SRB transmit the same data and implement the same QoS function, and the difference lies in that one supports the packet duplication function, while the other does not support the packet duplication function), where the SRB identity is predefined, and a user can determine to establish the packet duplication SRB according to the SRB identity. Two logical channel identities are predefined for the packet duplication SRB corresponding to the SRB identity. The two logical channel identities may be different from a logical channel identity of the SRB not supporting packet duplication or one of the logical channel identities is the same as the logical channel identity of the SRB not supporting packet duplication (in this case, one logical channel identity may be predefined for the packet duplication SRB, and the other logical channel identity is a predefined logical channel identity of the corresponding SRB not supporting packet duplication). Specifically, the following steps are included:

Step 1: User equipment receives RRC signaling (for example, an RRC connection reconfiguration message) from a base station, where the RRC signaling includes an identity of a packet duplication SRB to be established and further includes configuration information of the SRB supporting packet duplication.

Step 2: The user equipment establishes the corresponding packet duplication SRB according to the identity of the packet duplication SRB and the corresponding configuration information that are included in the received RRC signaling. The following operations (the operations are interchangeable in terms of order) may be specifically included:

Optionally, apply a predefined configuration of the packet duplication SRB corresponding to the SRB identity.
  Establish a PDCP entity, where if the PDCP entity requires a security configuration, then the PDCP entity is configured according to a security configuration of an MCG. If the PDCP entity or a packet duplication SCG SRB or a packet duplication SCG split SRB is established in an SCG, then the PDCP entity is configured according to a security configuration of the SCG. Optionally, the operation further includes configuring the PDCP entity to activate the packet duplication function; or configuring the PDCP entity to deactivate the packet duplication function.
  Establish one or two RLC entities according to rlc-Config included in the RRC signaling, where the two RLC entities may employ the same or different configurations. If different configurations are employed, then the corresponding packet duplication SRB in the RRC signaling includes two rlc-Config information elements.
  Establish two DCCH logical channels according to logicalChannelConfig included in the RRC signaling, where logical channel identities of the logical channels are respectively set to two predefined values corresponding to the packet duplication SRB.

Embodiment 5

A packet duplication SRB uses a different SRB identity (srb-Identity) from that of a corresponding SRB not supporting packet duplication (the SRB and the packet duplication SRB transmit the same data and implement the same QoS function, and the difference lies in that one supports the packet duplication function, while the other does not support the packet duplication function), where the SRB identity is predefined, and a user can determine to establish the packet duplication SRB according to the SRB identity. One logical channel identity (denoted as LCH_ID) is predefined for the packet duplication SRB corresponding to the SRB identity. The logical channel identity is different from a predefined logical channel identity of the corresponding SRB not supporting packet duplication or the logical channel identity is the same as the predefined logical channel identity of the SRB not supporting packet duplication. The other logical channel identity is the predefined logical channel identity plus an offset (denoted as offset). Preferably, the offset is a maximum configurable logical channel identity, and is denoted as MAX_LCH_ID. Specifically, the following steps are included:

Step 1: User equipment receives RRC signaling (for example, an RRC connection reconfiguration message) from a base station, where the RRC signaling includes an identity of a packet duplication SRB to be established and further includes configuration information of the SRB supporting packet duplication.

Step 2: The user equipment establishes the corresponding packet duplication SRB according to the identity of the packet duplication SRB and the configuration information of the packet duplication SRB that are included in the received RRC signaling. The following operations (the operations are interchangeable in terms of order) may be specifically included:

Optionally, apply a predefined configuration of the packet duplication SRB corresponding to the SRB identity.
  Establish a PDCP entity, where if the PDCP entity requires a security configuration, then the PDCP entity is configured according to a security configuration of an MCG. If the PDCP entity or a packet duplication SCG SRB or a packet duplication SCG split SRB is established in an SCG, then the PDCP entity is configured according to a security configuration of the SCG. Optionally, the operation further includes configuring the PDCP entity to activate the packet duplication function; or configuring the PDCP entity to deactivate the packet duplication function.
  Establish one or two RLC entities according to rlc-Config included in the RRC signaling, where the two RLC entities may employ the same or different configurations. If different configurations are employed, then the corresponding packet duplication SRB in the RRC signaling includes two rlc-Config information elements.
  Establish two DCCH logical channels according to logicalChannelConfig included in the RRC signaling. A logical channel identity of one logical channel is set to a predefined value LCH_ID, and a logical channel identity of the other logical channel is set to LCH_ID+offset. Preferably, the logical channel identity of the other logical channel is LCH_ID+MAX_LCH_ID. If a third logical channel further needs to be established, then a corresponding logical channel identity may be set to LCH+2(offset), and so on. That is, logical channel identities of other logical channels are LCH_ID plus a multiple of the offset.

Figure 5:
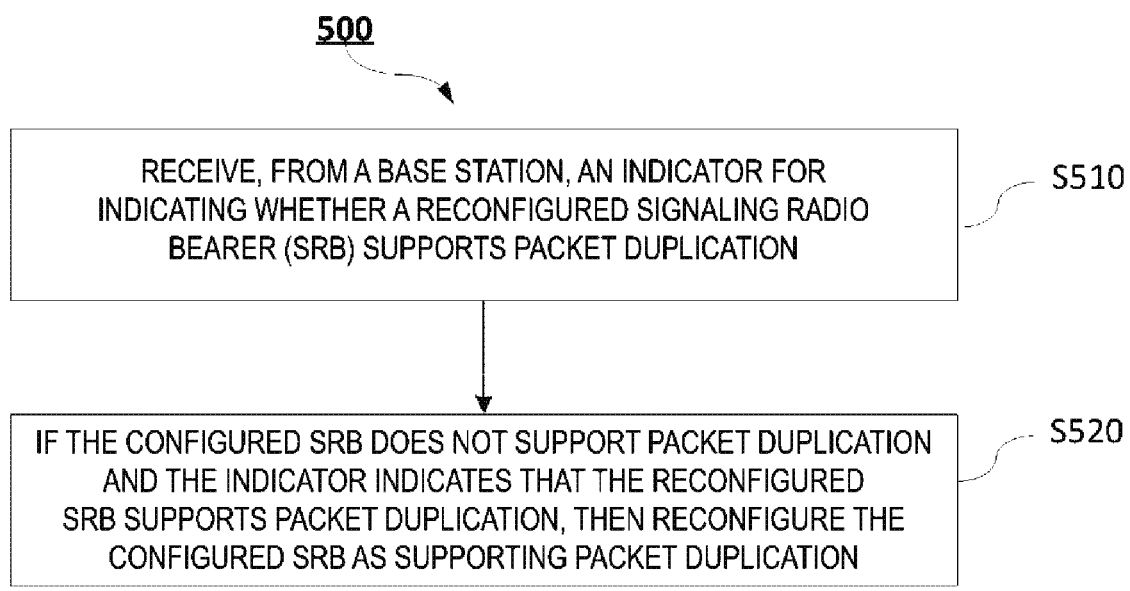
FIG. 5 is a flowchart of a method 500 used in user equipment (UE) according to an embodiment of the present disclosure.

FIG. 5 is a flowchart of a method 500 used in user equipment (UE) according to an embodiment of the present disclosure. The method 500 is used for reconfiguring whether an SRB supports packet duplication.

As shown in the figure, in step S510, the UE receives, from a base station, an indication for indicating whether a reconfigured signaling radio bearer (SRB) supports packet duplication.

Step S520: If the configured SRB does not support packet duplication and the indication indicates that the reconfigured SRB supports packet duplication, then the UE reconfigures the configured SRB as supporting packet duplication.

In one implementation, the method 500 further includes: if the configured SRB supports packet duplication and the indication indicates that the reconfigured SRB does not support packet duplication, then the UE reconfigures the configured SRB as not supporting packet duplication (not shown).

The following describes embodiments of reconfiguring a packet duplication SRB by user equipment in a carrier aggregation (CA) scenario.

Embodiment 1

In this embodiment, a packet duplication SRB uses the same SRB identity as that of a corresponding SRB not supporting packet duplication (the SRB and the packet duplication SRB transmit the same data and implement the same QoS function, and the difference lies in that one supports the packet duplication function, while the other does not support the packet duplication function).

Specifically, step 1: user equipment receives an RRC message from a base station, where the message may be an RRC reconfiguration message that may be used for a handover (the RRC message includes an information element mobilityControlInfo for indicating a handover) or non-handover (the RRC message does not include the information element mobilityControlInfo for indicating a handover) scenario. The RRC message includes an indication (denoted as fullConfig) for indicating application of full configuration to the RRC reconfiguration message. The RRC message further includes an SRB identity requiring reconfiguration, for example, an identity of an SRB requiring reconfiguration is included in an information element srb-ToAddModList. An indication may also be associated with the SRB requiring reconfiguration. The indication is used for indicating that the reconfigured SRB is a packet duplication SRB or that a corresponding PDCP entity supports repeated transmission of a PDCP PDU twice or more or that the corresponding PDCP entity supports the packet duplication function. That is, the user equipment reconfigures a configured SRB (also referred to as an existing or current SRB which is an SRB already configured before the UE receives the RRC message) corresponding to the SRB identity as a packet duplication SRB. The configured SRB may be a packet duplication SRB or an SRB not supporting packet duplication. For example, when the indication has a value of "1" or "TRUE" or "Setup" or when the indication appears, it indicates that the corresponding SRB is a packet duplication SRB or an SRB supporting the packet duplication function, or that the PDCP entity corresponding to the SRB supports repeated transmission of each PDCP PDU twice or more, or that the PDCP entity supports the packet duplication function; when the indication has a value of "0" or "FALSE" or "Release" or when the indication does not appear, it indicates that the corresponding SRB is not a packet duplication SRB or is an SRB not supporting the packet duplication function, or that the corresponding PDCP entity does not support the packet duplication function.

Step 2: For an SRB corresponding to the SRB identity included in the RRC message, if the configured SRB is an SRB not supporting packet duplication, namely, an SRB not supporting packet duplication is to be reconfigured as an SRB supporting packet duplication, then perform the following operations (the operations may be performed in other orders):

Apply a predefined configuration to a packet duplication SRB (optional).

Configure a PDCP entity to activate or deactivate the packet duplication function (optional).

Establish a new RLC entity and a new DCCH logical channel for the packet duplication SRB corresponding to the SRB identity. A logical channel identity of the logical channel may be set to one of the following (namely, the setting of the logical channel identity of the newly established logical channel is the same as the method for setting a logical channel identity given in the embodiments of establishing a packet duplication SRB): another predefined value corresponding to the SRB identity, a predefined value corresponding to the SRB identity plus an offset, and a logical channel identity corresponding to the SRB identity carried in the RRC message.

Apply a logical channel default configuration corresponding to the SRB identity to the corresponding SRB. The same or different logical channel default configurations may be applied to two logical channels. It is also possible to use a default configuration for one logical channel, and use logicalChannelConfig configuration information carried in the RRC message for the other logical channel.

For the SRB corresponding to the SRB identity included in the RRC message, if the configured SRB is a packet duplication SRB and the RRC signaling does not include an indication for indicating that the SRB is a duplication SRB, namely, a packet duplication SRB is to be reconfigured as an SRB not supporting packet duplication, then perform the following operations (the operations may be performed in other orders):

Configure a PDCP entity to deactivate the packet duplication function (optional).

Apply a predefined configuration corresponding to the SRB identity to an SRB that is an SRB not supporting packet duplication, namely, the predefined configuration is a predefined configuration corresponding to an SRB not supporting packet duplication.

Release one RLC entity, namely, release other RLC entities than an RLC entity corresponding to the SRB not supporting packet duplication or release other RLC entities than an RLC entity associated with a logical channel (a logical channel identity of the logical channel is a predefined value corresponding to the SRB not supporting packet duplication) corresponding to the SRB not supporting packet duplication.

Release one logical channel, namely, release other logical channels than the logical channel corresponding to the SRB not supporting packet duplication.

Apply an RLC default configuration corresponding to the SRB identity to the corresponding SRB.

Apply a logical channel default configuration corresponding to the SRB identity to the corresponding SRB.

Embodiment 2

If user equipment receives an RRC message from a base station, then the message may be an RRC reconfiguration message that may be used for a handover (the RRC message includes an information element mobilityControlInfo for indicating a handover) or non-handover (the RRC message does not include the information element mobilityControlInfo for indicating a handover) scenario. The RRC message includes an indication (denoted as fullConfig) for indicating application of full configuration to the RRC reconfiguration message. The RRC message further includes an SRB identity requiring reconfiguration, for example, an identity of an SRB requiring reconfiguration is included in an information element srb-ToAddModList. For an SRB corresponding to the SRB identity included in the RRC message: the user equipment reconfigures a configured SRB (also referred to as an existing or current SRB which is an SRB already configured before the UE receives the RRC message) corresponding to the SRB identity as an SRB not supporting packet duplication. The configured SRB may be a packet duplication SRB or an SRB not supporting packet duplication. Specifically, the following operations are included (the operations may be performed in other orders):

Apply a predefined configuration corresponding to the SRB identity to an SRB that is an SRB not supporting packet duplication, namely, the predefined configuration is a predefined configuration corresponding to an SRB not supporting packet duplication.

Release one RLC entity if the configured SRB is a packet duplication SRB. That is, release other RLC entities than an RLC entity corresponding to the SRB not supporting packet duplication or release other RLC entities than an RLC entity associated with a logical channel (a logical channel identity of the logical channel is a predefined value corresponding to the SRB not supporting packet duplication) corresponding to the SRB not supporting packet duplication.

Release one logical channel if the configured SRB is a packet duplication SRB. That is, release other logical channels than the logical channel corresponding to the SRB not supporting packet duplication, where a logical channel identity of the logical channel is not a predefined value corresponding to the SRB not supporting packet duplication.

Apply an RLC default configuration corresponding to the SRB identity to the corresponding SRB.

Apply a logical channel default configuration corresponding to the SRB identity to the corresponding SRB.

Figure 6:
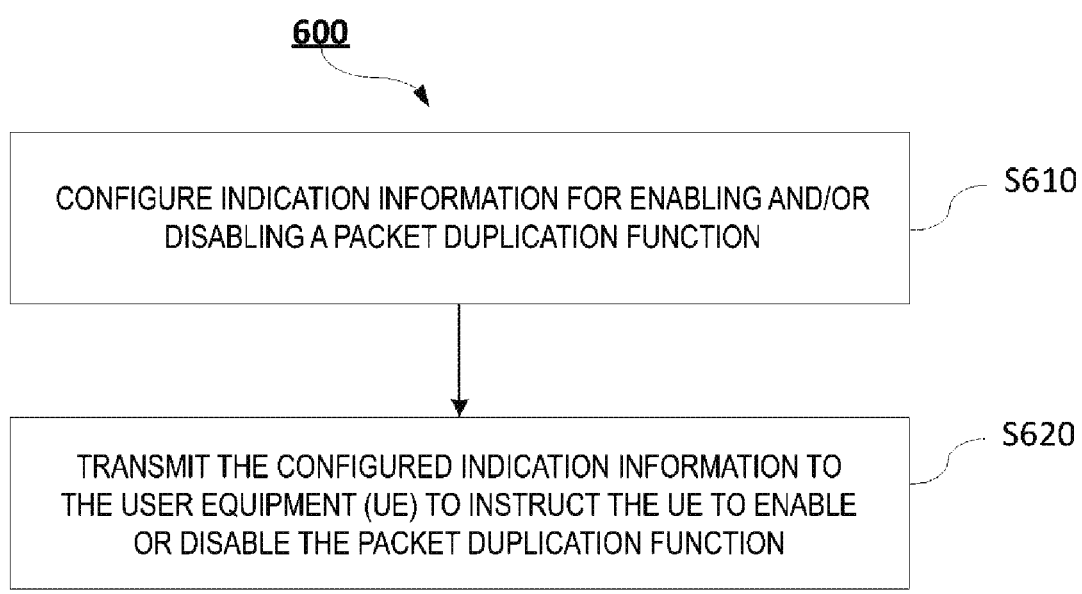
FIG. 6 is a flowchart of a method 600 used in a base station according to an embodiment of the present disclosure.

Configure a PDCP entity to deactivate the packet duplication function (optional). FIG. 6 is a flowchart of a method 600 used in a base station according to an embodiment of the present disclosure. The method 600 is used for instructing UE to activate and deactivate a PDCP packet duplication function.

As shown in the figure, in step S610, the base station configures indication information for activating and/or deactivating a packet duplication function. For example, the indication information may be represented by a newly defined PDCP control PDU, or one or more bits in a PDCP control PDU already defined for implementing other functions, or a newly defined MAC CE (Control Element) or the like.

Step S620: The base station transmits the configured indication information to the user equipment (UE) to instruct the UE to activate or deactivate the packet duplication function.

Figure 7:
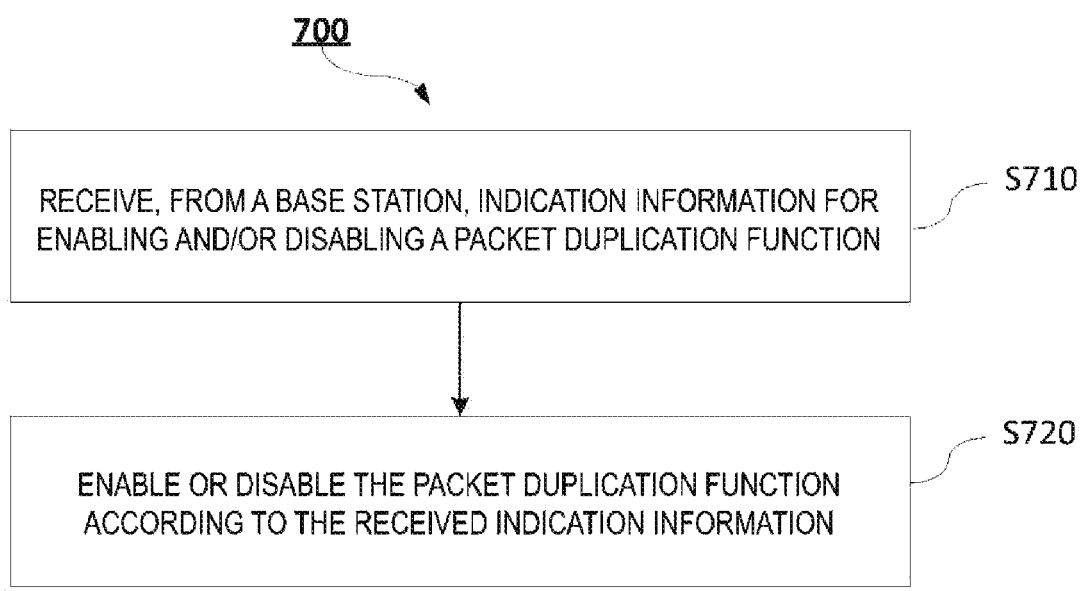
FIG. 7 is a flowchart of a method 700 used in user equipment (UE) according to an embodiment of the present disclosure.

FIG. 7 is a flowchart of a method 700 used in user equipment (UE) according to an embodiment of the present disclosure. The method 700 is used for activating and/or deactivating a PDCP packet duplication function.

As shown FIG. 7, in step S710, the UE receives, from a base station, indication information for activating and/or deactivating a packet duplication function. For example, the indication information may be represented by a newly defined PDCP control PDU, or one or more bits in a PDCP control PDU that is already defined for implementing other functions, or a newly defined MAC CE (Control Element) or the like.

Step S720: The UE activates or deactivates the packet duplication function according to the received indication information.

The following describes embodiments of activating and deactivating a PDCP packet duplication function, wherein methods in the embodiments can be applied to an SRB (namely, a packet duplication SRB and/or a packet duplication split SRB) and a DRB (namely, a packet duplication DRB and/or a packet duplication split DRB)

Embodiment 1

Figure 8:
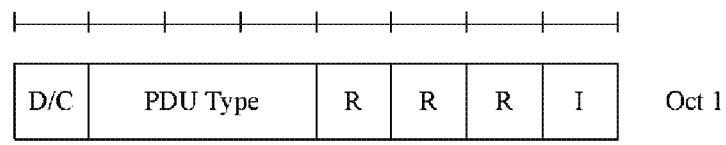
FIG. 8 is a schematic diagram of a PDCP control PDU.

A PDCP control PDU is defined and is used for transmitting indication information for activating and/or deactivating a packet duplication function of a PDCP entity. FIG. 8 illustrates an exemplary format of a PDCP control PDU. "D/C": 1 bit, indication information of a control PDU and a data PDU. A value of 0 indicates that the corresponding PDU is a control PDU, and a value of 1 indicates that the corresponding PDU is a data PDU. "PDU type": 3 bits, indication information of a PDU type. Different values correspond to different types of control PDUs. A value may be predefined for a control PDU for activating or deactivating the packet duplication function of the PDCP entity. For example, when "PDU type" has a value of "011" the corresponding control PDU is a control PDU for activating and/or deactivating the packet duplication function of the PDCP entity. "R": 1 bit, representing Reserved, the value of which may be set to 0 so that the receiving end will ignore the bit information. "I": 1 bit or multiple bits ("I" may also be represented by other symbols), different values of which are set to represent activating or deactivating of the packet duplication function of the PDCP entity. For example, "I" occupies 1 bit, and a value of "0" represents deactivating of the packet duplication function, and a value of "1" represents activating of the packet duplication function, and vice versa.

In the case of a packet duplication MCG SRB, a packet duplication MCG DRB, a packet duplication SCG SRB, or a packet duplication SCG DRB, the PDCP control PDU for deactivating the PDCP packet duplication function may further include an indication (also referred to as a field) for indicating whether a PDCP PDU is to be transmitted through an MCG or an SCG after the packet duplication function is deactivated. Or, "I" is not defined when the indication is defined. In this case, the user equipment reconfigures the PDCP entity according to the indication so that the PDCP PDU is transmitted through only the CG indicated in the indication, is not transmitted through the CG indicated in the indication, or is transmitted through other CGs than the CG indicated in the indication.

Embodiment 2

One or more bits in a PDCP control PDU that is already defined for implementing other functions are used to indicate activating or deactivating a packet duplication function of a PDCP entity. Optionally, the PDCP control PDU used for implementing other functions and activating or deactivating the packet duplication function of the PDCP entity is defined as a new PDU type.

Preferably, a reserved bit "R" in the PDCP control PDU used for a PDCP status report is used to carry information for activating or deactivating the packet duplication function of the PDCP entity. Optionally, the PDCP control PDU that includes a PDCP status report and used for activating or deactivating the packet duplication function of the PDCP entity is defined as a new PDU type.

Alternatively, a reserved bit "R" in the PDCP control PDU used for an interspersed ROHC feedback packet is used to carry information for activating or deactivating the packet duplication function of the PDCP entity. Optionally, the PDCP control PDU that includes the interspersed ROHC feedback packet and used for activating or deactivating the packet duplication function of the PDCP entity is defined as a new PDU type.

Embodiment 3

A MAC CE (Control Element) is defined and is used for activating and/or deactivating a packet duplication function (or a packet duplication function of a PDCP entity). Optionally, an indication is predefined for the MAC CE for activating and/or deactivating the packet duplication function (or the packet duplication function of the PDCP entity) and may be denoted as LCID. The LCID is used for indicating that the corresponding MAC CE is a MAC CE for activating and/or deactivating the packet duplication function.

Preferably, the MAC CE includes a DRB identity and/or an SRB identity for activating the packet duplication function, and when a DRB identity and/or an SRB identity is included in the MAC CE, it represents activating (or deactivating) of the corresponding packet duplication function. On the contrary, if a DRB identity and/or an SRB identity is not included in the MAC CE, then it can represent deactivating (or activating) of the corresponding packet duplication function. When a MAC entity receives the MAC CE, the MAC entity indicates the DRB identity and/or SRB identity included in the MAC CE to an upper layer (an RRC layer or a PDCP layer), and the upper layer activates or deactivates the packet duplication function of the corresponding DRB and/or SRB according to the indication information. Optionally, for a packet duplication DRB and/or SRB corresponding to a DRB identity and/or an SRB identity not indicated by a lower layer, the packet duplication function of the corresponding DRB and/or SRB is deactivated or activated.

Alternatively, the MAC CE includes a bitmap. The bitmap has a fixed size or variable size. Each bit in the bitmap corresponds to a SRB and/or DRB (packet duplication SRB and/or packet duplication DRB). Each bit in the bitmap has a value of "0" or "1", which respectively corresponds to deactivating or activating (or 0 represents activating and 1 represents deactivating) of the packet duplication function of the corresponding SRB and/or DRB. The size of the bitmap may be a maximum of SRBs and/or DRBs configurable by a system or the number of SRBs and DRBs configured or the number of packet duplication SRBs and/or packet duplication DRBs configured by a base station for UE. Optionally, first SRBs and then DRBs arranged in an ascending order according to SRB and/or DRB identities sequentially correspond to the bits in the bitmap. The sequential correspondence may be in the sequence from the first bit on the left in the first byte of the bitmap to right or from the first bit on the far right in the last byte of the bitmap to left. That is, the first bit on the left in the first byte of the bitmap corresponds to an SRB having the smallest identity or the first bit on the far right in the last byte of the bitmap corresponds to a DRB having the largest identity. For example, assume that SRB2, DRB1, and DRB3 supporting the packet duplication function are configured in the UE, three bits from the first bit on the left in the first byte of the bitmap to right sequentially correspond to SRB2, DRB1, and DRB3. For another example, respective bits in the bitmap may sequentially correspond to SRBs and DRBs in the system that are set as supporting the packet duplication function. Assume that SRB1 and SRB2 may be configured as supporting the packet duplication function and all DRBs may be configured as supporting the packet duplication function, and assume that the number of DRBs supported by the system is n. Then, 2+n bits from the first bit on the left to right (or from the last bit on the right to left) in the bitmap respectively correspond to SRB1, SRB2, DRB1, DRB2, . . . , and DRBn. "DRBi" represents a DRB having a DRB identity of "i."

Alternatively, packet duplication SRBs and packet duplication DRBs are transmitted through different MAC CEs for activating and/or deactivating packet duplication. Preferably, different LCID values are predefined for the two MAC CEs. Alternatively, the two MAC CEs use the same LCID value, but a field is used in the MAC CEs to indicate the type of the MAC CEs, and different values of the field are used to indicate whether the corresponding MAC CEs is a MAC CE for activating and/or deactivating packet duplication corresponding to a packet duplication SRB or a MAC CE for activating and/or deactivating packet duplication corresponding to a packet duplication DRB. For example, if the field is "0," then it indicates that the MAC CE is a MAC CE for activating and/or deactivating packet duplication corresponding to a packet duplication SRB; if the field is "1," then it indicates that the MAC CE is a MAC CE for activating and/or deactivating packet duplication corresponding to a packet duplication DRB. Vice versa.

In the case of a packet duplication MCG SRB or a packet duplication MCG DRB or a packet duplication SCG SRB or a packet duplication SCG DRB, it may be predefined that the MAC CE can only be transmitted from a MAC corresponding to an MCG or an SCG when the packet duplication function is activated or deactivated. For example, in the case of a packet duplication MCG SRB or a packet duplication MCG DRB, the corresponding MAC CE is transmitted through the MCG; in the case of a packet duplication SCG SRB or a packet duplication SCG DRB, the corresponding MAC CE is transmitted through the SCG.

Embodiment 4

A PDCP packet duplication function is activated or deactivated based on an activation/deactivation MAC CE. When a MAC layer receives an activation/deactivation-based MAC CE for activating or deactivating a SCell, indication information is indicated to an upper layer. The upper layer will activate or deactivate the packet duplication function according to the indication information.

Preferably, when a MAC CE for activating or deactivating an SCell is received, if the number of cells (including a PCell and an SCell) currently in an activated state is greater than one, then an upper layer (for example, RRC) is instructed to activate the packet duplication function of an SRB and/or a DRB that is already configured as supporting the packet duplication function; if the number of cells currently in an activated state is less than two (namely, only the PCell is in an activated state and other Cells are in a deactivated state), then the upper layer (for example, RRC) is instructed to deactivate the packet duplication function of the SRB and/or DRB that is already configured as supporting the packet duplication function.

Alternatively, when a MAC CE for activating or deactivating an SCell is received, if the number of cells (including a PCell and an SCell) currently in an activated state is greater than one, then indication information is indicated to the upper layer (for example, RRC), where the indication information indicates that the number of cells currently in the activated state is greater than one or indicates the number of cells currently in the activated state. The upper layer enables, according to the indication information, the packet duplication function of the SRB and/or DRB that is already configured as supporting the packet duplication function. If the number of cells (including a PCell and an SCell) currently in an activated state is less than two, then indication information is indicated to the upper layer (for example, RRC), where the indication information indicates that the number of cells currently in the activated state is less than two or indicates the number of cells currently in the activated state. The upper layer activates, according to the indication information, the packet duplication function of the SRB and/or DRB that is already configured as supporting the packet duplication function.

Alternatively, when the MAC layer receives a MAC CE for activating or deactivating an SCell, indication information is indicated to the upper layer only when the activated cells (including a PCell and an SCell) change from one to multiple and/or change from multiple to one, where the indication information is used for indicating the number of cells currently in the activated state or activating or deactivating the packet duplication function of the SRB and/or DRB. The upper layer will activate or deactivate the packet duplication function according to the indication information.

Embodiment 5

When only one cell is in an activated state, but a MAC layer receives data from two or more logical channels corresponding to the same packet duplication SRB or packet duplication DRB, the MAC layer indicates an error to an upper layer (for example, RRC) or indicates to the upper layer that only one cell is in the activated state or instructs the upper layer to deactivate the packet duplication function; or the MAC layer transmits the data from the two or more logical channels through one CC; or the MAC layer transmits data of only one logical channel (for example, transmits data from a logical channel having a smaller or smallest logical channel identity); or a MAC CE is constructed for requesting a base station to activate an SCell. If the MAC layer indicates an error to the upper layer or indicates to the upper layer that only one cell is in the activated state, then the upper layer may deactivate the packet duplication function or transmit an RRC message to the base station after receiving the indication, where the RRC message is used for requesting the base station to activate an SCell.

The following describes processing of a received PDCP PDU by a PDCP entity of a packet duplication SRB in user equipment The UE receives a PDCP data PDU from a base station; if the PDCP data PDU is a duplicate PDU or SDU, then the UE performs integrity verification (if supported) on the PDCP PDU or SDU; and if the integrity verification fails, then the UE indicates the integrity verification failure to an upper layer (for example, an RRC layer). After receiving the indication, the upper layer performs RRC connection reestablishment.

The algorithm embodiment described below involves the following parameters:

Last_Submitted_PDCP_RX_SN: the variable is used for indicating an SN of a PDCP SDU submitted to an upper layer last time for a PDCP entity corresponding to a DRB mapped to an RLC AM. In the embodiment of the present disclosure, since Last_Submitted_PDCP_RX_SN=Next_PDCP_RX_SN−1, the two variables can be used interchangeably.

Reordering_Window: indicating the size of a reordering window. The size of the reordering window is related to the number of bits occupied by a PDCP SN, and is half of the PDCP SN space.

RX_HFN: the variable is used for indicating the value of an HFN that generates a COUNT value, and the COUNT is used for PDCP PDUs received by a particular PDCP entity.

Next_PDCP_RX_SN: the variable is used for indicating a next desired PDCP SN at the receiving end of a particular PDCP entity.

PSCP SN: a PDCP sequence number, which may be a sequence number of a PDCP SDU or PDU.

Maximum_PDCP_SN: a maximum PDCP SN number, which is related to the number of bits occupied by an SN configured for a PDCP entity.

Figure 9:
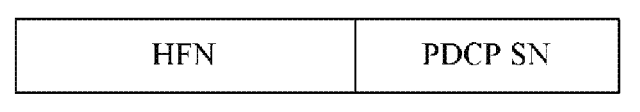

COUNT: consisting of an HFN and a PDCP SN, as shown in FIG. 9.

received PDCP SN: an SN of a received PDCP PDU.

Figure 10:
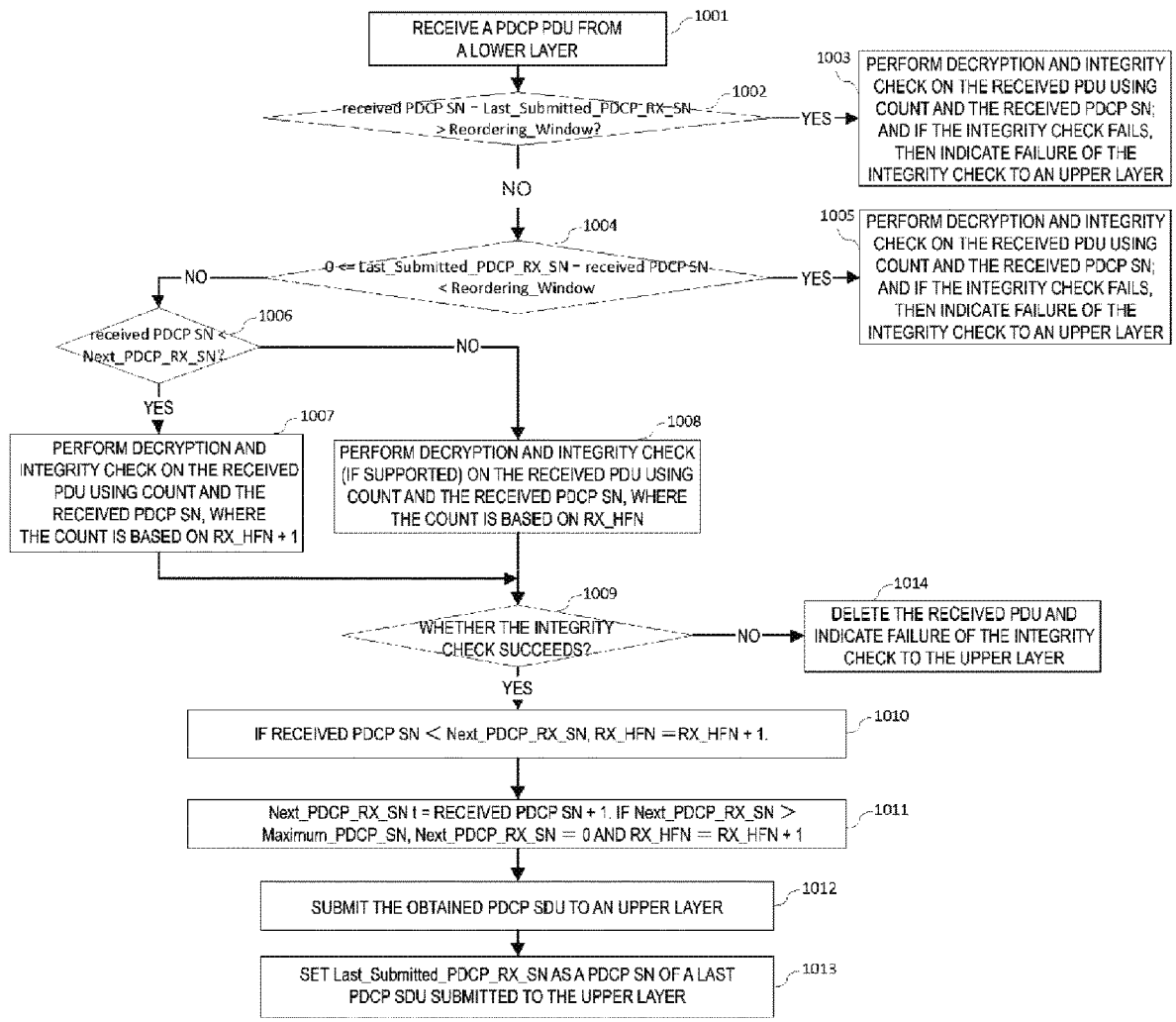
FIG. 10 is a schematic flowchart illustrating processing of a received PDCP PDU by a PDCP entity.

FIG. 10 is a schematic flowchart illustrating processing of a received PDCP PDU by a PDCP entity;

Step 1001: User equipment receives a PDCP PDU from a base station (or a lower layer).

Step 1002: Judge whether a received PDCP SN satisfies received PDCP SN—Last_Submitted_PDCP_RX_SN>Reordering_Window. If yes, then step 1003 is performed; otherwise, step 1004 is performed.

Step 1003: Perform decryption and integrity verification (if supported) on the received PDU using COUNT and the received PDCP SN, where the COUNT is based on RX_HFN−1 (a PDCP SDU is obtained after the PDU is decrypted); and if the integrity verification fails, then indicate the integrity verification failure to an upper layer (for example, RRC). Optionally, the obtained PDCP SDU is deleted. If the integrity verification fails, then the algorithm ends; if the integrity verification succeeds, then the process returns to step 1001.

Step 1004: Judge whether the received PDCP SN satisfies 0<=Last_Submitted_PDCP_RX_SN—received PDCP SN<Reordering_Window. If yes, then step 1005 is performed; otherwise, step 1006 is performed.

Step 1005: Perform decryption and integrity verification (if supported) on the received PDU using COUNT and the received PDCP SN, where the COUNT is based on RX_HFN (a PDCP SDU is obtained after the PDU is decrypted); and if the integrity verification fails, then indicate the integrity verification failure to an upper layer (for example, RRC). Optionally, the obtained PDCP SDU is deleted. If the integrity verification fails, then the algorithm ends; if the integrity verification succeeds, then the process returns to step 1001.

Step 1006: Judge whether a received PDCP SN satisfies received PDCP SN<Next_PDCP_RX_SN. If yes, then step 1007 is performed; otherwise, step 1008 is performed.

Step 1007: Perform decryption and integrity verification (if supported) on the received PDU using COUNT and the received PDCP SN, where the COUNT is based on RX_HFN+1 (a PDCP SDU is obtained after the PDU is decrypted).

Step 1008: Perform decryption and integrity verification (if supported) on the received PDU using COUNT and the received PDCP SN, where the COUNT is based on RX_HFN (a PDCP SDU is obtained after the PDU is decrypted).

Step 1009: Perform step 1010 if the integrity verification is supported and the integrity verification succeeds or the integrity verification is not supported. Otherwise, step 1014 is performed.

Step 1010: If received PDCP SN<Next_PDCP_RX_SN, RX_HFN=RX_HFN+1.

Step 1011: Next_PDCP_RX_SN t=received PDCP SN+1. If Next_PDCP_RX_SN>Maximum_PDCP_SN, Next_PDCP_RX_SN=0 and RX_HFN=RX_HFN+1.

Step 1012: Submit the obtained PDCP SDU to an upper layer.

Step 1013: Set Last_Submitted_PDCP_RX_SN to a PDCP SN of a last PDCP SDU submitted to the upper layer. This step is not performed if the variable Last_Submitted_PDCP_RX_SN is not used.

Step 1014: Delete the received PDCP data PDU and indicate the integrity verification failure to the upper layer.

It should be noted that the judging conditions in steps 1002 and 1004 may be performed in reverse order. The judging condition received PDCP SN<Next_PDCP_RX_SN in step 1006 and step 1010 is equivalent to Next_PDCP_RX_SN-received PDCP SN>Reordering_Window.

Figure 11:
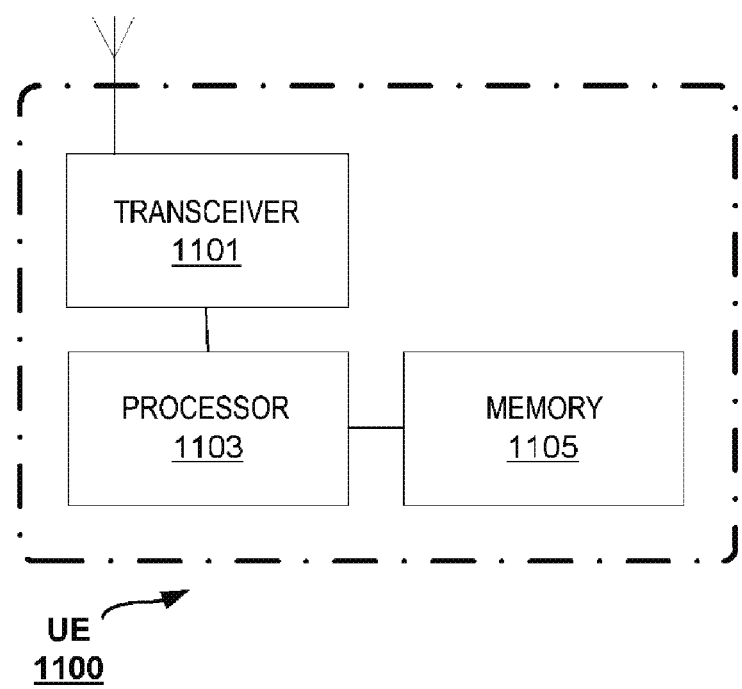
FIG. 11 is a schematic structural diagram of UE 1100 according to an embodiment of the present disclosure.

The structure of UE according to an embodiment of the present disclosure will be described below with reference to FIG. 11. FIG. 11 is a schematic structural diagram of UE 1100 according to an embodiment of the present disclosure. The UE 1100 can be used for executing the method described with reference to FIG. 4, FIG. 5, or FIG. 7.

As shown in FIG. 11, the UE 1100 includes a transceiver 1101 configured to perform external communication, a processing unit or a processor 1103, where the processor 1103 may be a single unit or a combination of multiple units configured to perform different steps of the method; and a memory 1105 storing computer-executable instructions that, when executed by the processor 1103, cause the UE 1100 to perform the following operations corresponding to the method 400: receiving, from a base station through the transceiver 1101, an indication for indicating whether a corresponding signaling radio bearer (SRB) supports packet duplication and configuration information of an SRB supporting packet duplication; and establishing the corresponding packet duplication SRB according to the received configuration information.

In one exemplary embodiment, the memory 1105 further stores instructions that cause the processor 1103 to execute the following operation: if the packet duplication SRB has the same SRB identity as that of an SRB not supporting packet duplication, then receiving the SRB identity of the corresponding packet duplication SRB from the base station.

In one exemplary embodiment, if the packet duplication SRB has a different SRB identity from that of a corresponding SRB not supporting packet duplication, then the indication is the SRB identity of the packet duplication SRB.

The memory 1105 may also store computer-executable instructions that, when executed by the processor 1103, cause the UE 1100 to execute the following operations corresponding to the method 500: receiving, from a base station through the transceiver 1101, an indication for indicating whether a reconfigured signaling radio bearer (SRB) supports packet duplication; if the configured SRB does not support packet duplication and the indication indicates that the reconfigured SRB supports packet duplication, then reconfiguring, by the UE, the configured SRB as supporting packet duplication.

In one exemplary embodiment, the memory 1105 further stores instructions that cause the processor 1103 to execute the following operation: if the configured SRB supports packet duplication and the indication indicates that the reconfigured SRB does not support packet duplication, then reconfiguring the configured SRB as not supporting packet duplication.

The memory 1105 may also store computer-executable instructions that, when executed by the processor 1103, cause the UE 1100 to execute the following operations corresponding to the method 700: receiving, from a base station through the transceiver 1101, indication information for activating and/or deactivating a packet duplication function; and activating or deactivating the packet duplication function according to the received indication information.

Figure 12:
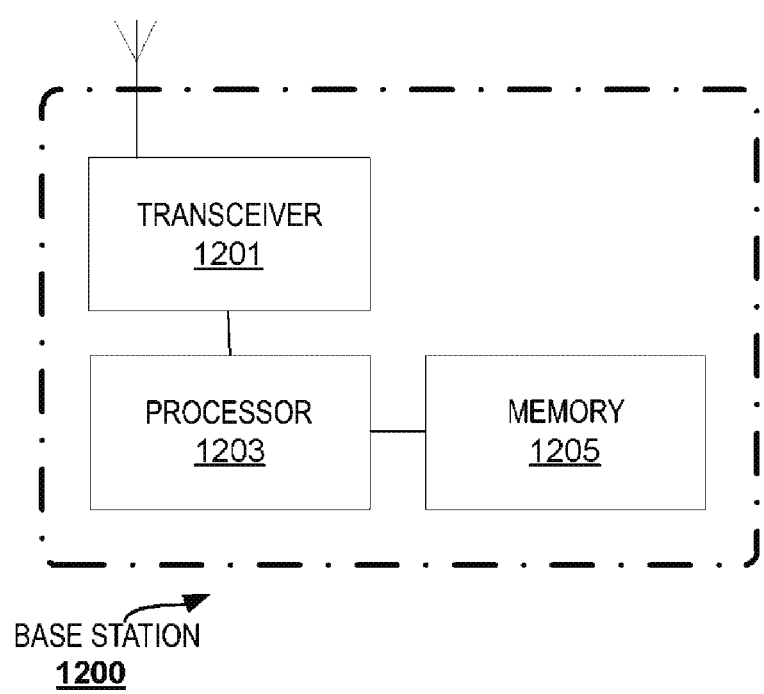
FIG. 12 is a schematic structural diagram of a base station 1200 according to an embodiment of the present disclosure.

The structure of a base station according to an embodiment of the present disclosure will be described below with reference to FIG. 12. FIG. 12 is a schematic structural diagram of a base station 1200 according to an embodiment of the present disclosure. The base station 1200 can be used for executing the method described with reference to FIG. 6.

As shown in FIG. 12, the base station 1200 includes a transceiver 1201 configured to perform external communication; a processing unit or a processor 1203, where the processor 1203 may be a single unit or a combination of multiple units configured to perform different steps of the method; and a memory 1205 storing computer-executable instructions that, when executed by the processor 1203, cause the base station 1200 to perform the following operations corresponding to the method 600: configuring indication information for activating and/or deactivating a packet duplication function; and transmitting the configured indication information to the user equipment (UE) to instruct the UE to activate or diactivate the packet duplication function.

Figure 13:
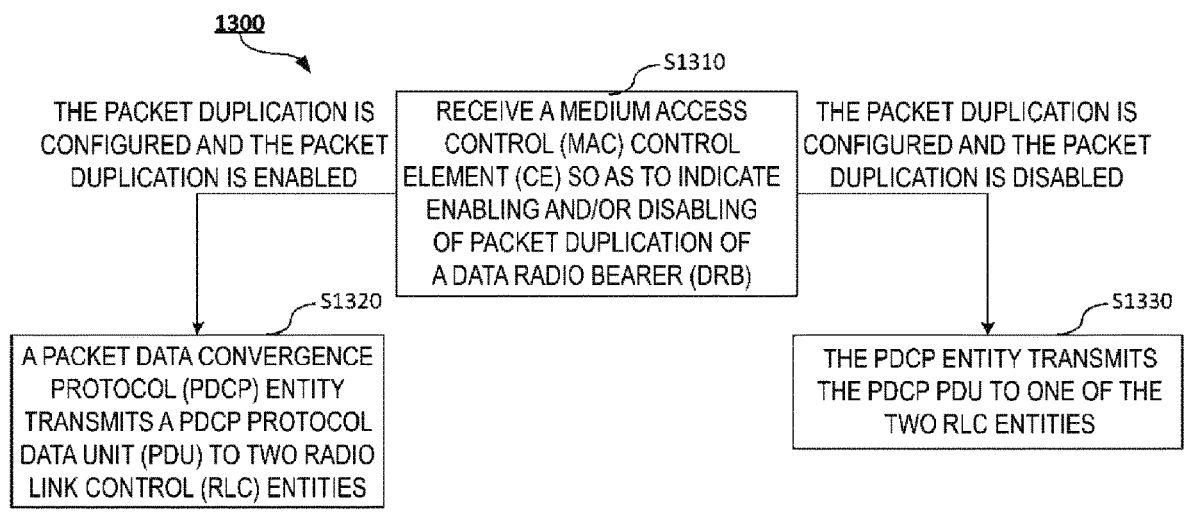
FIG. 13 is a flowchart of a method 1300 executed at user equipment (UE) according to an embodiment of the present disclosure.

FIG. 13 is a flowchart of a method 1300 executed at user equipment (UE) according to an embodiment of the present disclosure.

As shown FIG. 13, in step S1310, the UE receives a medium access control (MAC) control element (CE) so as to indicate activating and/or deactivating of packet duplication of a data radio bearer (DRB).

If the packet duplication is configured and the packet duplication is activated, then in step S1320, a Packet Data Convergence Protocol (PDCP) entity submits a PDCP protocol data unit (PDU) to two radio link control (RLC) entities.

If the packet duplication is configured and the packet duplication is deactivated, then in step S1330, the PDCP entity submits the PDCP PDU to one of the two RLC entities.

The MAC CE includes a bitmap having a fixed size, each bit in the bitmap corresponding to a packet duplication DRB identity arranged in an ascending order; a bit set to 1 in the bitmap indicates activating of the packet duplication of the corresponding DRB, and a bit set to 0 in the bitmap indicates deactivating of the packet duplication of the corresponding DRB.

Figure 14:
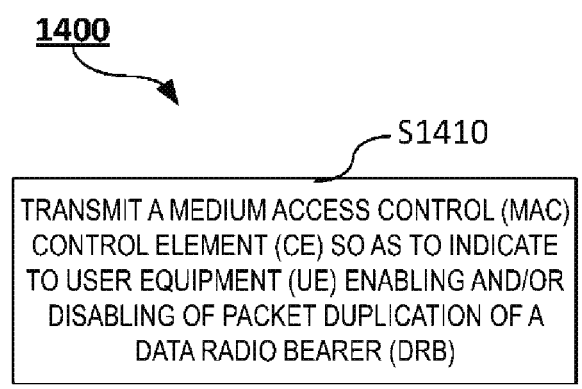
FIG. 14 is a flowchart of a method 1400 executed at a base station (BS) according to an embodiment of the present disclosure.

FIG. 14 is a flowchart of a method 1400 executed at a base station (BS) according to an embodiment of the present disclosure.

As shown in FIG. 14, in step S1410, the BS transmits a medium access control (MAC) control element (CE) so as to indicate to user equipment (UE) activating and/or deactivating of packet duplication of a data radio bearer (DRB).

If the packet duplication is configured and the packet duplication is activated, then a Packet Data Convergence Protocol (PDCP) entity of the UE submits a PDCP protocol data unit (PDU) to two radio link control (RLC) entities.

If the packet duplication is configured and the packet duplication is deactivated, then the PDCP entity submits the PDCP PDU to one of the two RLC entities.

The MAC CE includes a bitmap having a fixed size, each bit in the bitmap corresponding to a packet duplication DRB identity arranged in an ascending order; a bit set to 1 in the bitmap indicates activating of the packet duplication of the corresponding DRB, and a bit set to 0 in the bitmap indicates deactivating of the packet duplication of the corresponding DRB.

Figure 15:
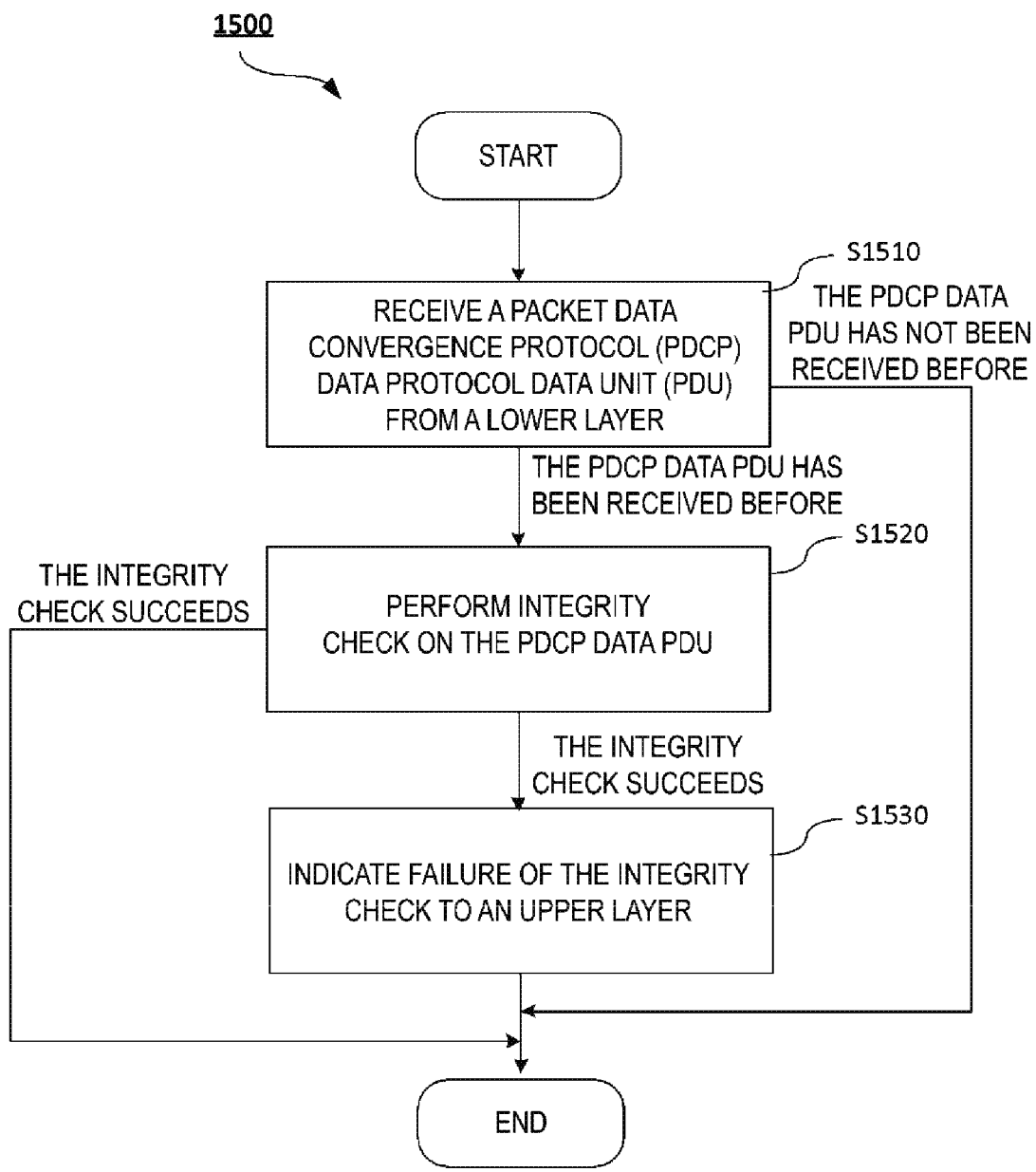
FIG. 15 is a flowchart of a method 1500 executed at user equipment (UE) according to an embodiment of the present disclosure.

FIG. 15 is a flowchart of a method 1500 executed at user equipment (UE) according to an embodiment of the present disclosure.

As shown in FIG. 15, in step S1510, the UE receives a Packet Data Convergence Protocol (PDCP) data protocol data unit (PDU) from a lower layer.

If the PDCP data PDU has been received before, then in step S1520, integrity verification is performed on the PDCP data PDU. If the PDCP data PDU has not been received before, then the method ends.

If the integrity verification fails, in step S1530, then the integrity verification failure is indicated to an upper layer. If the integrity verification succeeds, then the method ends.

Figure 16:
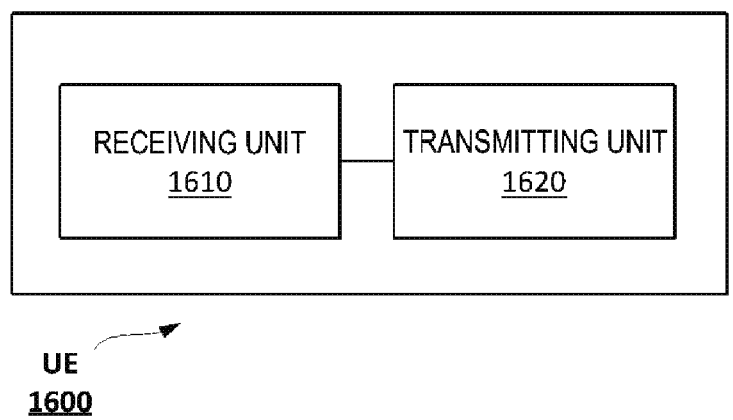
FIG. 16 is a schematic structural diagram of UE 1600 according to an embodiment of the present disclosure.

FIG. 16 is a schematic structural diagram of UE 1600 according to an embodiment of the present disclosure.

The UE 1600 can be used for executing the method described with reference to FIG. 13.

As shown in FIG. 16, the UE 1600 includes a receiving unit 1610 configured to receive a medium access control (MAC) control element (CE) so as to indicate activating and/or deactivating of packet duplication of a data radio bearer (DRB); and a submitting unit 1620 configured to: if the packet duplication is configured and the packet duplication is activated, then submit, by a Packet Data Convergence Protocol (PDCP) entity, a PDCP protocol data unit (PDU) to two radio link control (RLC) entities; and if the packet duplication is configured and the packet duplication is deactivated, then submit, by the PDCP entity, the PDCP PDU to one of the two RLC entities.

The MAC CE includes a bitmap having a fixed size, each bit in the bitmap corresponding to a packet duplication DRB identity arranged in an ascending order; a bit set to 1 in the bitmap indicates activating of the packet duplication of the corresponding DRB, and a bit set to 0 in the bitmap indicates deactivating of the packet duplication of the corresponding DRB.

Figure 17:
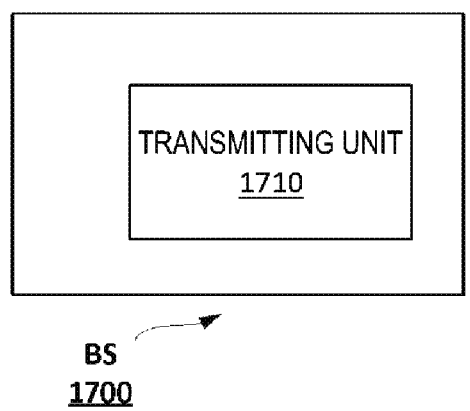
FIG. 17 is a schematic structural diagram of a BS 1700 according to an embodiment of the present disclosure.

FIG. 17 is a schematic structural diagram of a BS 1700 according to an embodiment of the present disclosure.

The BS 1700 can be used for executing the method described with reference to FIG. 14.

As shown in FIG. 17, the BS 1700 includes a transmitting unit 1710 configured to transmit a medium access control (MAC) control element (CE) so as to indicate to user equipment (UE) activating and/or deactivating of packet duplication of a data radio bearer (DRB).

If the packet duplication is configured and the packet duplication is activated, then a Packet Data Convergence Protocol (PDCP) entity of the UE submits a PDCP protocol data unit (PDU) to two radio link control (RLC) entities.

If the packet duplication is configured and the packet duplication is deactivated, then the PDCP entity submits the PDCP PDU to one of the two RLC entities.

The MAC CE includes a bitmap having a fixed size, each bit in the bitmap corresponding to a packet duplication DRB identity arranged in an ascending order; a bit set to 1 in the bitmap indicates activating of the packet duplication of the corresponding DRB, and a bit set to 0 in the bitmap indicates deactivating of the packet duplication of the corresponding DRB.

Figure 18:
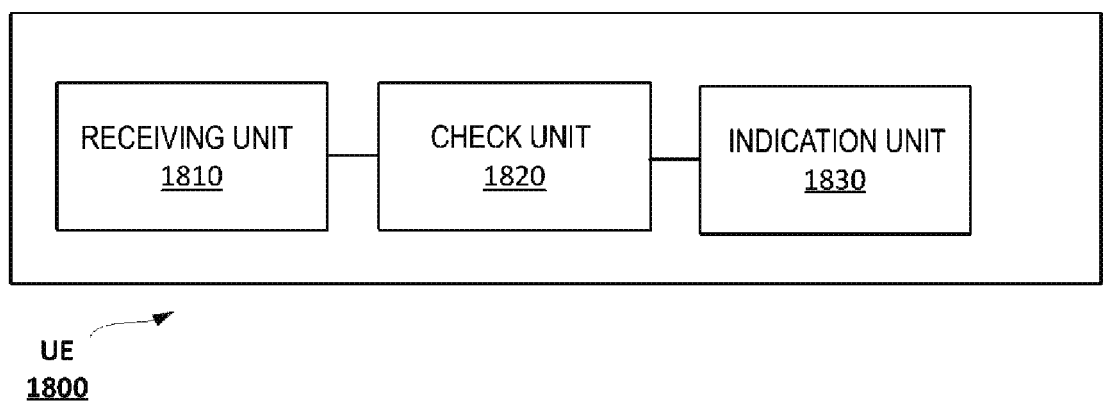
FIG. 18 is a schematic structural diagram of UE 1800 according to an embodiment of the present disclosure.

FIG. 18 is a schematic structural diagram of UE 1800 according to an embodiment of the present disclosure.

The UE 1800 can be used for executing the method described with reference to FIG. 15.

As shown in FIG. 18, the UE 1800 includes a receiving unit 1810 configured to receive a Packet Data Convergence Protocol (PDCP) data protocol data unit (PDU) from a lower layer; a verification unit 1820 configured to: if the PDCP data PDU has been received before, then perform integrity verification on the PDCP data PDU; and an indication unit 1830 configured to: if the integrity verification fails, then indicate the integrity verification failure to an upper layer.

The present disclosure further provides at least one computer storage medium in the form of a non-volatile or volatile memory, such as an electrically erasable programmable read-only memory (EEPROM), a flash memory, and a hard disk drive.

Computer-executable instructions, when executed by the processor 1103, cause the UE 1100 to perform, for example, the actions of the processes described previously with reference to FIG. 4, FIG. 5, FIG. 7, FIG. 13, and FIG. 15, or when executed by the processor 1203, cause the base station 1200 to perform, for example, the actions of the processes described previously with reference to FIG. 6 and FIG. 14.

The processor may be a single CPU (central processing unit), but may also include two or more processors. For example, the processor may include a general-purpose microprocessor, an instruction set processor and/or a related chip set and/or dedicated microprocessor (for example, an application specific integrated circuit (ASIC)). The processor may also include an on-board memory for caching purposes. For example, the computer storage medium may be a flash memory, a random access memory (RAM), a read-only memory (ROM), or an EEPROM.

The computer-executable instructions or program running on the device according to the present invention may be a program that enables the computer to implement the functions of the embodiments of the present invention by controlling the central processing unit (CPU). The program or information processed by the program can be stored temporarily in a volatile memory (for example, a random access memory (RAM)), a hard disk drive (HDD), a non-volatile memory (for example, a flash memory), or other memory systems.

The computer-executable instructions or program for implementing the functions of the embodiments of the present invention may be recorded on a computer-readable storage medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims.

Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment (UE) comprising:
receiving circuitry configured to receive a media access control (MAC) control element (CE) by which duplication is/are activated and/or deactivated for data radio bearer (DRB)(s) configured with duplication; and
submitting circuitry configured to submit a packet data convergence protocol (PDCP) protocol data unit (PDU) to two radio link control (RLC) entities in a case that the duplication is activated, and
submit the PDCP PDU to one of the two RLC entities in a case that the duplication is deactivated;
wherein the MAC CE includes a bitmap with a fixed size and each bit of the bitmap corresponds to a DRB identity of a DRB in the DRB(s) in ascending order, the bit is set to one to indicate that the duplication of the DRB is activated, the bit is set to zero to indicate that the duplication of the DRB is deactivated.

2. The UE according to claim 1 further comprising;
the receiving circuitry configured to receive a PDCP data PDU from lower layers;
verification circuitry configured to perform integrity verification of the PDCP Data PDU; and
indication circuitry configured to indicate integrity verification failure to upper layer in a case that the integrity verification fails.

3. A base station comprising:
transmitting circuitry configured to transmit a media access control (MAC) control element (CE) by which duplication is/are activated and/or deactivated for data radio bearer (DRB)(s) configured with duplication;
wherein a packet data convergence protocol (PDCP) protocol data unit (PDU) is submitted to two radio link control (RLC) entities in a case that the duplication is activated, and
the PDCP PDU is submitted to one of the two RLC entities in a case that the duplication is deactivated;
wherein the MAC CE includes a bitmap with a fixed size and each bit of the bitmap corresponds to a DRB identity of a DRB in the DRB(s) in ascending order, the bit is set to one to indicate that the duplication of the DRB is activated, the bit is set to zero to indicate that the duplication of the DRB is deactivated.

4. A method performed by a user equipment (UE), comprising:
receiving a media access control (MAC) control element (CE) by which duplication is/are activated and/or deactivated for data radio bearer (DRB)(s) configured with duplication; and
submitting a packet data convergence protocol (PDCP) protocol data unit (PDU) to two radio link control (RLC) entities in a case that the duplication is activated, and
submitting the PDCP PDU to one of the two RLC entities in a case that the duplication is deactivated;
wherein the MAC CE includes a bitmap with a fixed size and each bit of the bitmap corresponds to a DRB identity of a DRB in the DRB(s) in ascending order, the bit is set to one to indicate that the duplication of the DRB is activated, the bit is set to zero to indicate that the duplication of the DRB is deactivated.

5. A method performed by a base station, comprising:
transmitting a media access control (MAC) control element (CE) by which duplication is/are activated and/or deactivated for data radio bearer (DRB)(s) configured with duplication;
wherein a packet data convergence protocol (PDCP) protocol data unit (PDU) is submitted to two radio link control (RLC) entities in a case that the duplication is activated, and
the PDCP PDU is submitted to one of the two RLC entities in a case that the duplication is deactivated;
wherein the MAC CE includes a bitmap with a fixed size and each bit of the bitmap corresponds to a DRB identity of a DRB in the DRB(s) in ascending order, the bit is set to one to indicate that the duplication of the DRB is activated, the bit is set to zero to indicate that the duplication of the DRB is deactivated.

* * * * *